United States Patent
Farris

(10) Patent No.: US 6,292,478 B1
(45) Date of Patent: *Sep. 18, 2001

(54) TELECOMMUNICATIONS SYSTEM

(75) Inventor: Robert D. Farris, Sterling, VA (US)

(73) Assignee: Bell Atlantic Network Services, Inc., Arlington, VA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/753,154

(22) Filed: Nov. 21, 1996

Related U.S. Application Data

(63) Continuation-in-part of application No. 08/753,197, filed on Nov. 21, 1996.

(51) Int. Cl.[7] .................................................. H04L 12/64
(52) U.S. Cl. ............................................. 370/352; 370/356
(58) Field of Search .................................... 370/400, 402, 370/401, 353, 354, 355, 356; 379/213, 93.23, 207

(56) References Cited

U.S. PATENT DOCUMENTS

| | | |
|---|---|---|
| 3,484,560 | 12/1969 | Jaeger, Jr. et al. . |
| 4,054,756 | 10/1977 | Comella et al. . |
| 4,872,160 | 10/1989 | Hemmady et al. . |
| 4,958,341 | 9/1990 | Hemmady et al. . |
| 4,959,855 * | 9/1990 | Daudelin ................................ 379/213 |
| 5,008,929 | 4/1991 | Olsen et al. . |
| 5,046,183 | 9/1991 | Dorst et al. . |
| 5,341,374 | 8/1994 | Lewen et al. . |
| 5,375,068 | 12/1994 | Palmer et al. . |
| 5,410,754 | 4/1995 | Koltzbach et al. . |
| 5,434,913 | 7/1995 | Tung et al. . |
| 5,490,247 | 2/1996 | Tung et al. . |
| 5,493,568 | 2/1996 | Sampat et al. . |
| 5,572,583 * | 11/1996 | Wheeler, Jr. et al. ............... 379/207 |
| 5,608,786 | 3/1997 | Gordon . |
| 5,724,355 | 3/1998 | Bruno et al. . |
| 5,724,412 * | 3/1998 | Srinivasan ......................... 379/93.23 |
| 5,726,984 | 3/1998 | Kubler et al. . |
| 5,884,262 * | 3/1999 | Wise et al. ........................... 704/270 |

* cited by examiner

Primary Examiner—Huy D. Vu
(74) Attorney, Agent, or Firm—McDermott, Will & Emery

(57) ABSTRACT

A public switched telephone network utilizing program controlled switching systems controlled by common channel interoffice signaling (CCIS) is arranged in an architecture to provide a methodology to permit a caller to set-up and carry out a telephone call over the Internet from telephone station to telephone station without access to computer equipment and without the necessity of maintaining a subscription to any Internet service. The Internet telephone service includes special telephone services such as directory assistance, credit card calling, both local and long distance, collect calling, and third party charge calling. The special services may utilize human operator assistance or may be completely automated. The service for the most part is rendered through the use of telephone procedures presently familiar to the public from usage of the public telephone network. The system utilizes existing common channel signaling facilities along with Internet signaling and voice switching to permit the use of existing public switched telephone network plant for providing the new Internet services.

19 Claims, 25 Drawing Sheets

490

| Area Code | NNX | ITS Address |
|---|---|---|
| ⋮ | | |

| POP(1) | POP(2) | Total Bandwidth | Unused Bandwidth |
|---|---|---|---|
| $ITS_A$ | $ITS_B$ | 155 Mb/s | 55 Mb/s |
| $ITS_A$ | $ITS_C$ | 466 Mb/s | 64 Mb/s |
| $ITS_B$ | $ITS_A$ | 622 Mb/s | 256 Mb/s |
| ⋮ | | | |

| Calling # | Guaranteed Service Level (Mb/s) |
|---|---|

FIG. 14

| Destination | Source Node | Destination Node | Reserved Bandwidth |
|---|---|---|---|
| $ITS_B$ | $IP_1$ | $IP_2$ | OC - 1 |
| $ITS_C$ | $IP_1$ | $IP_3$ | DS - 3 |
| RAS | $IP_2$ | $IP_3$ | OC - 9 |
| | | | |

492

TELECOMMUNICATIONS SYSTEM

RELATED APPLICATIONS

This application is a continuation in part of application Ser. No. 08/753,197, filed Nov. 21, 1996, entitled Telecommunications System.

TECHNICAL FIELD

The present invention relates to a telecommunications system which includes telecommunications networks operating in conjunction with a wide area internetwork, such as the Internet, and more particularly relates to providing telephone services through such an internetwork including special service call handling.

ACRONYMS

The written description uses a large number of acronyms to refer to various services, messages and system components. Although generally known, use of several of these acronyms is not strictly standardized in the art. For purposes of this discussion, acronyms therefore will be defined as follows:

Advanced Intelligent Network (AIN)
Central Control Unit (CPU)
Central Office (CO)
Central Office Code (NNX)
Common Channel Signaling (CCS)
Common Channel Interoffice Signaling (CCIS)
Customer Premises Equipment (CPE)
Destination Point Code (DPC)
Domain Name Service (DNS)
Dual Tone Multifrequency (DTMF)
Dynamic Host Configuration Protocol (DHCP)
Integrated Service Control Point (ISCP)
Integrated Services Digital Network (ISDN)
ISDN User Part (ISDN-UP)
International Standards Organization (ISO)
Internet Protocol (IP)
Internet Telephony Server (ITS)
Line Information Database (LIDB)
Local Access and Transport Area (LATA)
Local Area Network (LAN)
Master Control Unit (MCU)
Message Signaling Unit (MSU)
Message Transfer Part (MTP)
Open Systems Interconnection (OSI)
Operator Service System (OSS)
Origination Point Code (OPC)
Plain Old Telephone Service (POTS)
Point in Call (PIC)
Point in Routing (PIR)
Point of Presence (POP)
Public Switch Telephone Network (PSTN)
Recent Change (RC)
Routing and Administration Server (RAS)
Service Control Point (SCP)
Service or Switching Point (SSP)
Signaling System 7 (SS7)
Signaling Point (SP)
Signaling Transfer Point (STP)
Special Service Announcement System (SSAS)
Traffic Service Position System (TSPS)
Transaction Capabilities Applications Protocol (TCAP)
Transmission Control Protocol (TCP)
Transmission Control Protocol/Internet Protocol (TCP/IP)

BACKGROUND

The "Internet" is a collection of networks, including Arpanet, NSFnet, regional networks such as NYsernet, local networks at a number of university and research institutions, and a number of military networks. The protocols generally referred to as TCP/IP were originally developed for use only through Arpanet and have subsequently become widely used in the industry. The protocols provide a set of services that permit users to communicate with each other across the entire Internet. The specific services that these protocols provide are not important to the present invention, but include file transfer, remote log-in, remote execution, remote printing, computer mail, and access to network file systems.

The basic function of the Transmission Control Protocol (TCP) is to make sure that commands and messages from an application protocol, such as computer mail, are sent to their desired destinations. TCP keeps track of what is sent, and retransmits anything that does not get to its destination correctly. If any message is too long to be sent as one "datagram," TCP will split it into multiple datagrams and makes sure that they all arrive correctly and are reassembled for the application program at the receiving end. Since these functions are needed for many applications, they are collected into a separate protocol (TCP) rather than being part of each application. TCP is implemented in the transport layer of the OSI reference model.

The Internet Protocol (IP) is implemented in the network layer of the OSI reference model, and provides a basic service to TCP: delivering datagrams to their destinations. TCP simply hands IP a datagram with an intended destination; IP is unaware of any relationship between successive datagrams, and merely handles routing of each datagram to its destination. If the destination is a station connected to a different LAN, the IP makes use of routers to forward the message.

In simplified fashion the Internet may be viewed as a series of routers connected together with computers connected to the routers. In the addressing scheme of the Internet an address comprises four numbers separated by dots. An example would be 164.109.211.237. Each machine on the Internet has a unique number which constitutes one of these four numbers. In the address the leftmost number is the highest number. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This continues until the packet arrives at the destination computer. The separate packets that constitute a message may not travel the same path depending on traffic load. However they all reach the same destination and are assembled in their original order in a connectionless fashion. This is in contrast to connection oriented modes such as frame relay and ATM or voice.

One or more companies have recently developed software for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers.

The book "Mastering the Internet", Glee Cady and Pat McGregor, SYBEX Inc., Alameda, Calif., 1994, ISBN 94-69309, very briefly describes three proprietary programs said to provide real-time video and voice communications via the Internet.

Palmer et al. U.S. Pat. No. 5,375,068, issued Dec. 20, 1994 for Video Teleconferencing for Networked Workstations discloses a video teleconferencing system for networked workstations. A master process executing on a local processor formats and transmits digital packetized voice and video data, over a digital network using TCP/IP protocol, to remote terminals.

Lewen et al. U.S. Pat. No. 5,341,374, issued Aug. 23, 1994 for Communication Network Integrating Voice Data and Video with Distributed Call Processing, discloses a local area network with distributed call processing for voice, data and video. Real-time voice packets are transmitted over the network, for example to and from a PBX or central office.

Hemmady et al. U.S. Pat. No. 4,958,341, issued Sep. 18, 1990 for Integrated Packetized Voice and Data Switching System, discloses an integrated packetized voice and data switching system for a metropolitan area network (MAN). Voice signals are converted into packets and transmitted on the network. Tung et al. U.S. Pat. No. 5,434,913, issued Jul. 18, 1995, and U.S. Pat. No. 5,490,247, issued Feb. 6, 1996, for Video Subsystem for Computer Based Conferencing System, disclose an audio subsystem for computer-based conferencing. The system involves local audio compression and transmission of information over an ISDN network.

Hemmady et al. U.S. Pat. No. 4,872,160, issued Oct. 3, 1989, for Integrated Packetized Voice and Data Switching System, discloses an integrated packetized voice and data switching system for metropolitan area networks.

Sampat et al. U.S. Pat. No. 5,493,568, issued Feb. 20, 1996, for Media Dependent Module Interface for Computer Based Conferencing System, discloses a media dependent module interface for computer based conferencing system. An interface connects the upper-level data link manager with the communications driver.

Koltzbach et al. U.S. Pat. No. 5,410,754, issued Apr. 25, 1995, for Bi-Directional Wire Line to Local Area Network Interface and Method, discloses a bi-directional wire-line to local area network interface. The system incorporates means for packet switching and for using the internet protocol (IP).

Insofar as is known, there does not exist at this date a publicly available Internet telephony service, much less a sophisticated Internet telephony service capable of special service call handling.

When wired telephone service was first provided on a commercial basis during the latter part of the last century, all telephone calls were completed manually by an operator. An operator responded to a calling signal, learned the identity of the called subscriber, and then utilized a plug and jack connector to interconnect the calling and called stations. Sometime after the invention of the telephone, a trend began toward the automation of telephone switching. Ultimately direct distance dialing was instituted which allows a calling subscriber to directly dial most long distance calls in this country and to many foreign countries with and in many instances without operator intervention. In addition to automating long distance calling, several systems have been proposed for completely automating the handling of calls instituted from coin stations.

Several arrangements have also been proposed for automating special service calls including person-to-person, collect, credit card, and bill-to-third party. Special service calls are difficult to automate because of the different variations in each call type and the need for substantial interaction between the various parties. One history of such developments is provided in Comella et al U.S. Pat. No. 4,054,756, issued Oct. 18, 1977, for Method and apparatus for automating special service call handling. The Comella patent describes yet another proposal for providing automation for special service calls in a wired telephone network and is incorporated by reference herein in its entirety. Still another approach to the problem is described in Dorst et al. U.S. Pat. No. 5,046,183, issued Sep. 3, 1991, for Semi-Automated Operator Assistance Telecommunication Calls. That patent describes a proposed system using so-called "intelligent telephones" wherein the need for operator assistance is at least partially eliminated.

Disclosure of the Invention

Objects of the Invention

It is an object of the present invention to provide comprehensive telephone service via the Internet to users of the public telecommunications network without a need for such customers to have computer access or computer literacy.

It is a further object of the invention to provide such telephone service in a seamless and transparent fashion including special telephone services such as directory assistance, credit card calling both local and long distance, collect calling, third party charge calling, and calls from toll stations.

It another object of the invention to provide with such Internet telephone services on both an operator assisted and an automated basis.

SUMMARY OF THE INVENTION

A public switched telephone network utilizing program controlled switching systems controlled by common channel interoffice signaling (CCIS) and preferably an advanced intelligent network (AIN) CCIS system is arranged in an architecture to provide a methodology for facilitating telephone use of the Internet by customers on an impromptu basis. The system permits a caller to set-up and carry out a telephone call over the Internet from telephone station to telephone station without access to computer equipment and without the necessity of maintaining a subscription to any Internet service. Billing may be accomplished on a per call basis. The calls may be inter and intra LATA, region or state or country. It is a particular feature of the invention that such Internet telephone service includes special telephone services such as directory assistance, credit card calling, both local and long distance, collect calling, and third party charge calling. The special services may utilize human operator assistance or may be completely automated. The service for the most part is rendered through the use of telephone procedures presently familiar to the caller from usage of the public switched telephone network. The system utilizes existing common channel signaling facilities along with Internet signaling and voice switching to permit the use of existing public switched telephone network plant for providing the new Internet services.

DESCRIPTION OF THE DRAWINGS

FIG. 14 is a diagram illustrating the stored virtual paths in a router of FIG. 9.

BEST MODE FOR CARRYING OUT THE INVENTION

Figure 1:
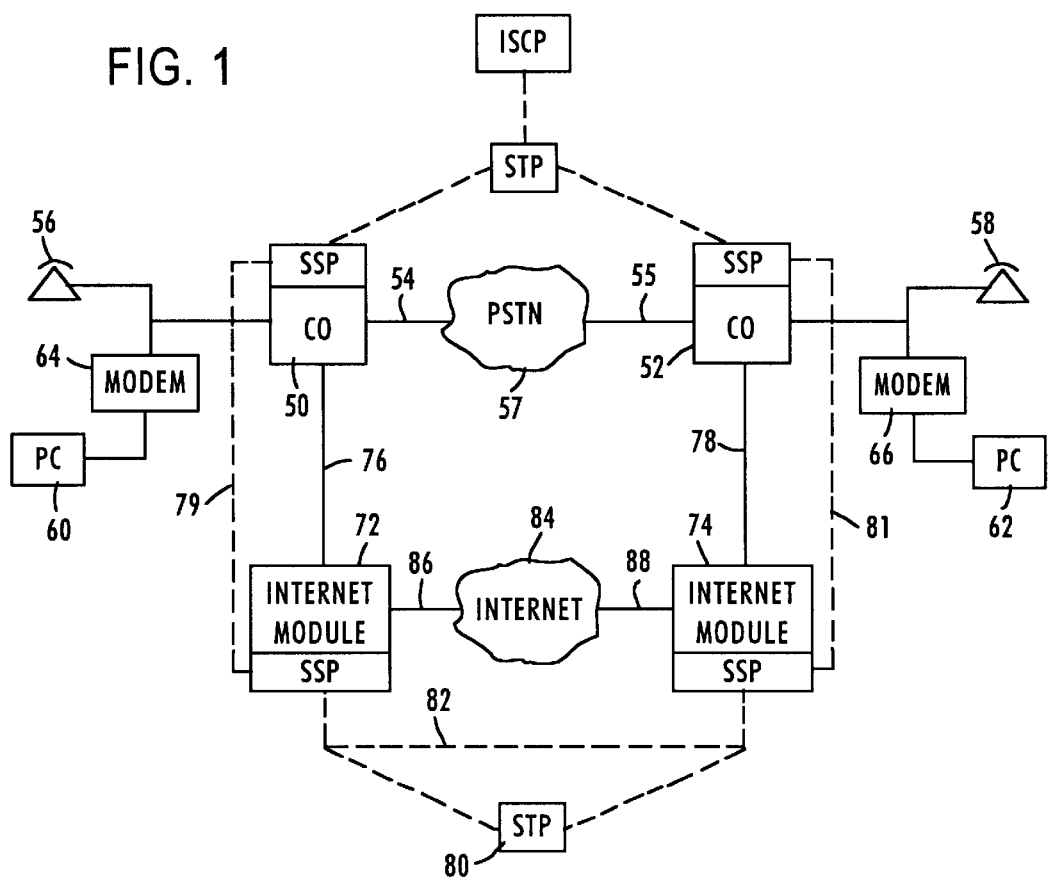
FIG. 1 shows in simplified block diagram form one example of an Advanced Intelligent Network (AIN) controlled Public Switched Telephone Network (PSTN) arranged in an architecture to provide Internet telephone service.

Referring to FIG. 1 there is shown a simplified block diagram of a public switched telephone network (PSTN) equipped to use common channel interoffice signaling (CCIS) with an advanced intelligent network (AIN), arranged in an architecture to provide one embodiment of Internet telephone service via one or more PSTNs. In FIG. 1 there are shown two service or signal switching point (SSP) capable central offices 50 and 52, which may be located in the same or different states and regions. These central offices are connected by trunks indicated at 54 and 55 to the PSTN indicated by a cloud 57. Each central office, or end office (EO) in this illustration, is connected by local loops to subscribers customer premises equipment (CPE) such as telephone terminals 56 and 58. These may be basic instruments for providing Plain Old Telephone Service (POTS). The subscriber premises are also shown as having personal computers (PCs) 60 and 62 connected to the local loops via modems 64 and 66. The SSPs associated with the central offices 50 and 52 are connected by common channel interoffice signaling (CCIS) links to a signal transfer point (STP) which in turn may be connected to an integrated signal control point (ISCP). While the STP functionality is here shown as constituting a single STP it will be appreciated that this is for the purpose of simplicity and that a hierarchy of STPs may be involved.

Each of the central offices 50 and 52 is provided with an Internet Module here indicated at 72 and 74 connected by T1 trunks 76 and 78. Alternatively the Internet Module hardware may be situated at the central office and associated with the switching system. The Internet Modules may be provided with SSP capabilities and connected into the CCIS network as indicated by the links to the illustrative STP 80. The SSPs serving the Internet Module are inter-connected with the central office SSPs and CCIS network as shown here by illustrative links 79 and 81. The Internet Modules may be linked for signaling purposes by conventional F links indicated at 82. The Internet Modules are connected to the Internet cloud by T1/T3 trunks 86 and 88.

Figure 2:
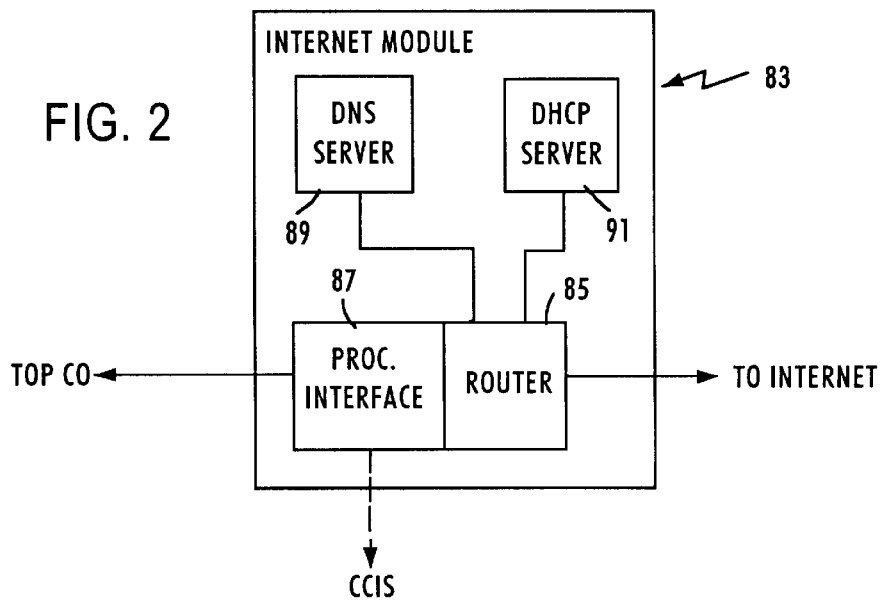
FIG. 2 shows the functional architecture of one embodiment of an Internet Module.

The functional architecture of one embodiment of such an Internet Module is shown diagrammatically in FIG. 2. The Internet Module, generally indicated at 83, includes a router 85 of the type now generally used in Internet practice. The Internet Module is provided with a central control unit (CPU) (not shown) and processing capability as illustratively shown at 87. It will be appreciated by those skilled in the art that the same CPU may be used to control the router 85 and that the functionalities of the blocks shown at 85 and 87 may be combined. Connected to the router are a Domain Name Service (DNS) server 89 and a Dynamic Host Configuration Protocol (DHCP) server 91 of the type conventionally used by Internet Service Providers in existing Internet Service. The router interface is connected to the central office and to the CCIS network while the router is connected to the Internet. The Internet Module is sometimes referred to herein as a server, Internet server, or Internet telephony server.

Figure 3:
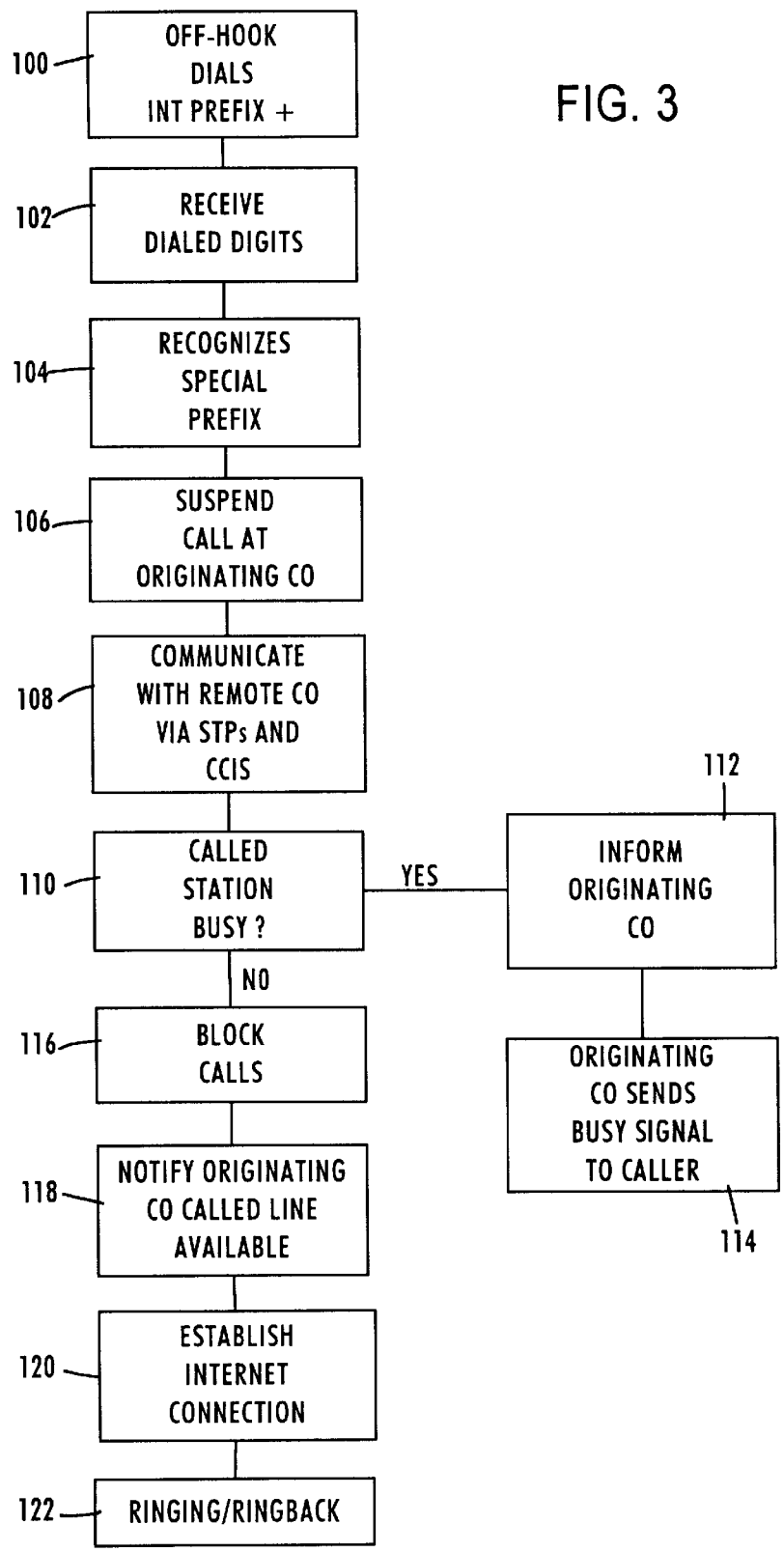
FIGS. 3 and 4 show simplified flow diagrams of one mode of operation of the system of FIG. 1.
Figure 4:
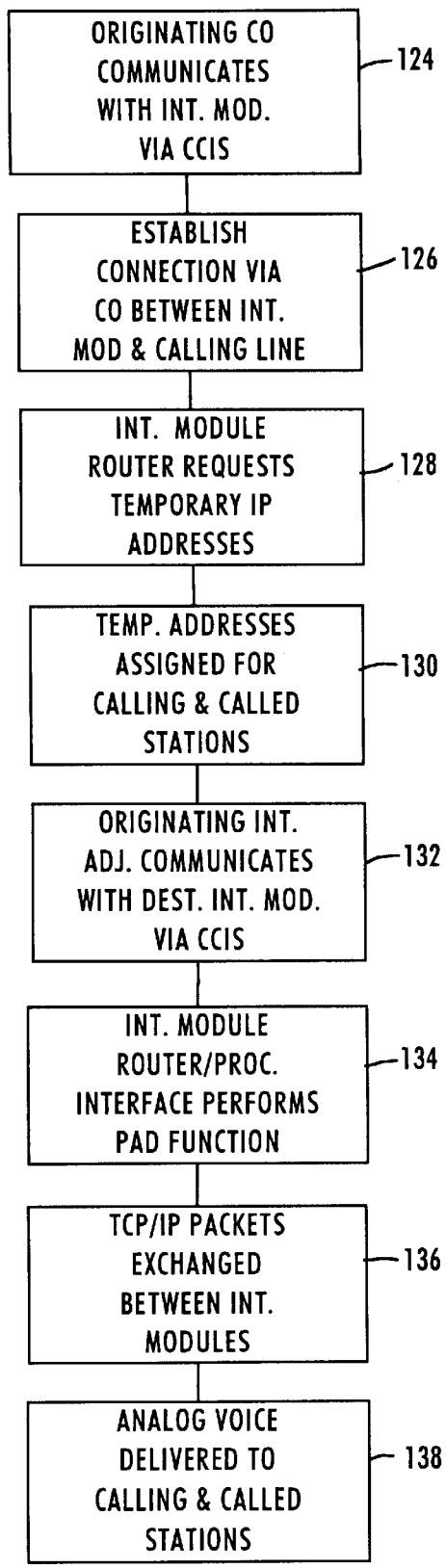

One mode of operation of the system of FIG. 1 is now described in relation to the simplified flow diagrams of FIGS. 3 and 4. According to this embodiment an Internet connection is used to link a calling to a called telephone without the necessity of either party possessing or using personal or office computer equipment. The subscriber in this example uses the POTS station at 56 to initiate an Internet call to a called party at the POTS station 58. The caller goes off-hook and dials *82. This prefix has been established by the Telco offering the service as a predesignated prefix with which the public may initiate an Internet telephone call. The dialing of the prefix *82 is followed by the dialing of the directory number of the called party at the station 58.

As is illustrated in the method shown in FIG. 3, the calling party goes off-hook and dials the prefix *82 at 100. At 102 the central office switching system responds to an off-hook and receives the dialed digits from the calling station. At 104 the central office switching system analyzes the received digits and determines from the prefix *82 that the call is an Internet call. Responsive to its programming it knows that the call must be completed through a remote central office and that further processing is necessary. At 106 the local or originating central office suspends the call and at 108 sends a CCIS query message through one or more of the STP's.

The query message goes to the central office to which the called station is connected. The receiving or destination central office receives the query and determines at 110 whether or not the called station at 58 is busy. If the called station is busy, the receiving central office so informs the originating central office at 112. At 114 the originating central office provides a busy signal to the calling station.

If the called station is not busy, the receiving central office busies out the called station line by blocking all calls at 116. The receiving or destination central office then informs the originating central office that the called line is available and waiting at 118 and that the processor in the Internet Module associated with the central office 52 is available.

An Internet virtual connection is then established between the calling and called stations at 120 as presently will be described in detail. The receiving or destination central office provides a ringing signal to the called station and the originating central office sends ringback tone back through the local loop to the calling station at 122. When the called station goes off-hook and the Internet virtual connection is completed the conversation via the Internet can commence.

Referring next to the flow diagram in FIG. 4 one example of the set up of the Internet connection is now described. When the originating central office receives from the destination central office the CCIS signal announcing that the called station is available and waiting, the originating central office may send a CCIS message to the Internet Module 72 and the processor interface 87 to the router 85. This message delivers the directory numbers of the calling station and the called station and requests establishment of an Internet connection (or virtual connection) between the two.

The processor interface and router may then react to receipt of that CCIS signal and request the temporary assignment of Internet addresses for the processors associated with the respective central offices. Upon completion of the assignment of the addresses the processor 87 may send a CCIS signal to the originating central office advising of that fact. This CCIS or SS7 communication between the originating central office and the originating Internet Module is indicated at 124. When the originating central office receives the message that the addresses have been assigned the switching system connects the originating local loop to the Internet Module 72. This connection is indicated at 126.

As an alternative to this connection procedure the originating central office may establish the line or trunk connection to the Internet Module 72 immediately upon receipt of the CCIS signal indicating that the called station is available and waiting. In this alternative the originating central office then sends the directory numbers of the calling and called stations along with a request to establish an Internet connection or virtual connection between the two stations for a voice communication session either via the line or trunk connection to the Internet Module 72 or via the CCIS link to the Internet Module.

Following either of the foregoing embodiments of the initial connection steps, the Internet Module router 85 in the Internet Module 72 sends a request for the assignment of temporary IP addresses for the two directory numbers to the DHCP server 91 as indicated at 128. The DHCP server hears the message and offers an IP address for each directory number for a certain time period which may be determined by the router or the server. The router may request a specified time period and the DHCP server may decline and offer a longer or shorter period, seeking mutual agreement. Upon agreement the addresses are accepted and assigned at 130. At 132 originating Internet Module 72 triggers a CCIS message to the destination Internet Module 74 which includes the temporary IP address assigned to the called directory number and associated processor.

As an alternative to the obtaining of an Internet address for the processor associated with the receiving central office at the originating central office switching system and its associated Internet Module the address may be obtained at the receiving central office switching system and its associated Internet Module and communicated to the originating central office switching system via the common channel signaling link.

As the conversation commences the originating Internet Module 72 is receiving from the originating central office 50 over the trunk connection digitized speech in DSO format. The Internet Module implements the function of a packet assembler and disassembler or PAD and assembles packets in TCP/IP format. This is indicated at 134. The packets bear the source and destination IP addresses and the digitized speech payload. The packets are dispatched from the originating router 85 onto the Internet and are delivered to the destination router and Internet Module 74. The receiving router and associated processor have the directory number of the called party and the matching IP address which were obtained via CCIS signaling from the originating router as indicated at step 132 described hereinabove. The destination router and its processor interface perform the inverse function of the originating router and make the necessary translation of the TCP/IP packets to DS0 format which is delivered over the destination trunk to the destination central office. The switching system in that office converts the DS0 to analog and delivers the analog speech signal over the destination local loop to the destination telephone station 58. The responsive speech signal from the destination telephone station is processed in inverse fashion by the destination central office switching system and destination Internet Module and delivered to the Internet in TCP/IP format. The originating Internet Module and central office switching system also act in inverse fashion to deliver to the originating telephone station an analog voice signal. The packet exchange is indicated in FIG. 4 at 136. The two way transfer of voice signals is indicated at 138.

Upon the establishment of the line/trunk connection to the Internet Module the originating central office may send billing information to the switch journal which indicates that an Internet call has been initiated and that may be recorded in the conventional manner. The DHCP server may also incorporate a billing capability which may be utilized as an alternative to journal billing if desired. Thus the DHCP server may initiate a clocking mechanism upon the assigning of the IP addresses to start the clock for charging the customer. When the IP address is released tolling of the charge ceases with a time based stamping attributed to the IP assignment.

Figure 5:
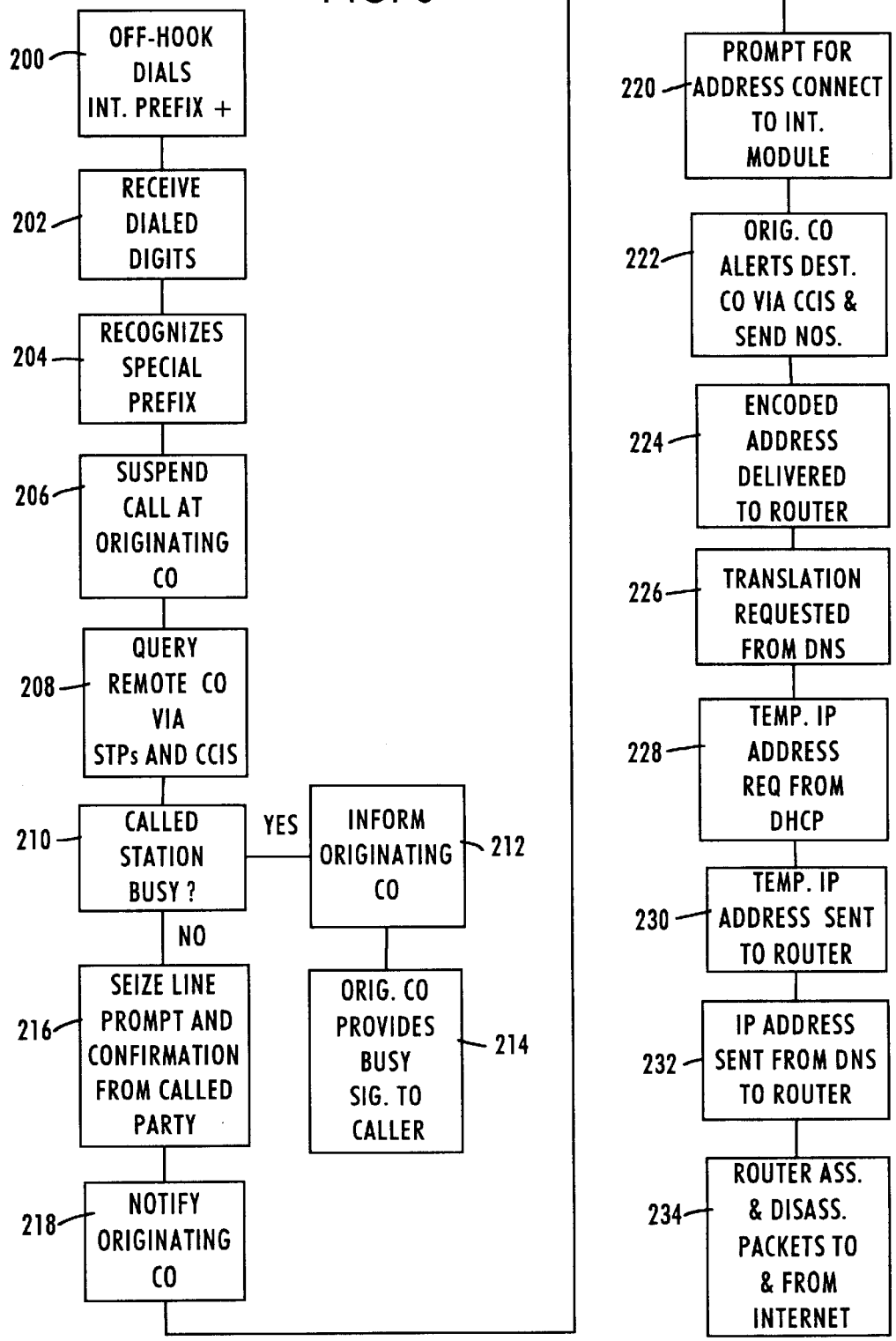
FIG. 5 shows a simplified flow diagram of another mode of operation of the system of FIG. 1.

Another mode of operation of the system of FIG. 1 is now described in relation to the simplified flow diagram of FIG. 5. A customer using the POTS station at 56 as an originating station desires a voice connection to a called party on the premises of the POTS station 58. The calling party is aware that the proposed called party has at those premises a personal computer with voice capabilities and has knowledge of the Internet domain or hostname address of the proposed called party.

The Telco offering the service of the invention has established a prefix *82 for a telephone to telephone call as has been described in the previously discussed example. In this embodiment the Telco also establishes a second prefix *83 for voice communication from telephone to a voice capable computer possessing an Internet address. The communication establishment is here commenced by the calling party going off-hook and dialing the prefix *83 at 200.

At 202 the central office switching system at the originating central office responds to an off-hook and receives the dialed digits from the calling station. At 204 the central office switching system analyzes the received digits and determines from the prefix *83 that the call is an Internet call from a telephone station caller to a computer terminal at the customer premises of the called party. Responsive to its programming the originating office switching system knows that the call must be completed through a remote central office and that further processing is necessary. At 206 the local or originating central office suspends the call and at 208 sends a CCIS query message through one or more of the STP's.

The query message goes to the central office to which the called station is connected as determined by the called directory number that was dialed by the caller. The receiving or destination central office receives the query and determines at 210 whether or not the local loop to the premises of the station at 58 is busy. If the called local loop is busy, the receiving central office so informs the originating central office at 212. At 214 the originating central office provides a busy signal to the calling station.

If the called local loop is not busy, the receiving central office seizes the line. Upon the line going off hook the destination central office delivers a voice prompt to the responding party to activate the CPE computer to accept an Internet voice call. The central office also prompts the responding party to confirm that this has been accomplished. This is shown at step 216. A distinctive ring may be used in lieu of the prompt or together with the prompt to alert the receiving party that a telephone call is arriving via the Internet and that it will be handled by microphone and speaker associated with the sound card in the called party's computer.

The receiving or destination central office then informs the originating central office that the called line is available and that the computer is waiting at 218. As an alternative to this procedure the destination central office may alert the called computer by applying an alert signal between the tones of the ringing signal.

The originating central office issues a voice prompt to the calling party requesting that party to spell out the domain or hostname of the called party and immediately completes the trunk connection from the originating central office to the originating Internet Module. This step is shown in FIG. 5 at 220. Simultaneously the originating central office alerts the originating Internet Module that a domain or hostname call has been initiated and sends the directory numbers of the calling and called party. This parallel step is indicated at 222.

Figure 6:
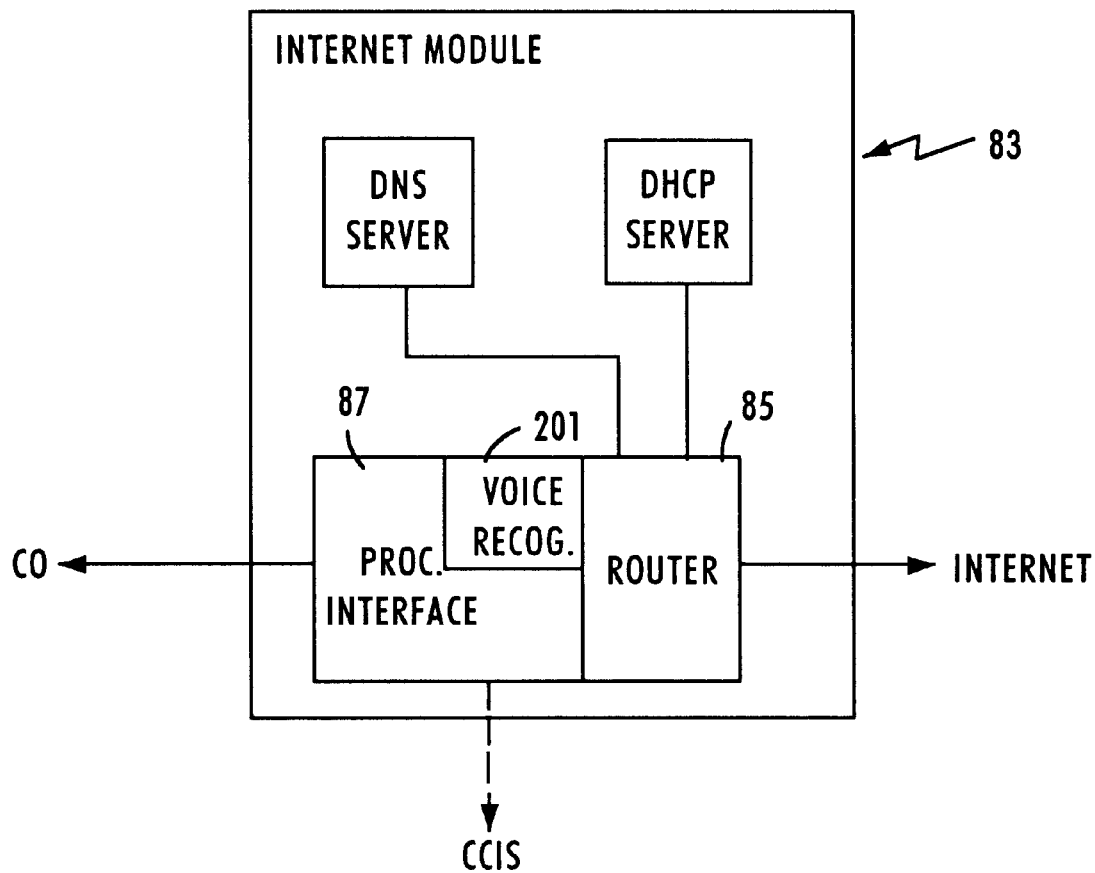
FIG. 6 shows the functional architecture of another example of an Internet Module.

In this embodiment of the invention the Internet Module is provided with a processor interface to the router which includes a voice recognition card to translate the incoming address to a TCP/IP format signal. An Internet Module of this type is illustrated in FIG. 6 where the voice card is shown at 201. The arriving address signal is delivered by the voice card and processor interface to the router 85. This step is shown at 224 in FIG. 5.

The router requests a domain name translation from the DNS server 89. This is indicated at step 226. At substantially the same time the router broadcasts a request for a temporary IP address for the calling directory number. This is indicated at step 228. The DHCP server provides the caller with a temporary IP address from the pool of addresses supplied by the Internet Service Provider which in this case is the Telco. The DHCP server selects an address from the pool and sends the address to the router at 230.

The Domain Name Service (DNS) server provides the translation from the domain or host name supplied by the caller into an IP address. Since each site maintains its own server no single site on the Internet is in possession of all of the translation data. The overall data constitutes a distributed database and relies on the servers at the individual sites. Access to the DNS is through a resolver and software library functions. The function in this case takes a domain name or hostname and returns an IP address. The functionality also is capable of providing the inverse function of taking an IP address and returning a hostname.

The IP address is sent by the DNS server to the router for incorporation into the packets to be assembled and dispatched onto the Internet. This step is shown at step 232. The router and its processor interface again serve a PAD function and transmit and receive TCP/IP packets to the Internet. This is indicated at 234.

In this embodiment of the invention the originating Internet Module and its processor interfaced router perform the functions of signal compression and expansion as well as packet assembly and disassembly (PAD). Thus the incoming DS0 signals from the originating central office are compressed from the 64 kbs DS0 rate to a 28.8 kbs modem rate assembled into TCP/IP protocol. The TCP/IP signals are transmitted via the Internet to the destination Internet Module 74. In this case the destination Internet Module may deliver the incoming TCP/IP signal direct to the computer modem 66. The voice communication may continue between the caller using the telephone station at 56 and the called party using the called computer at 62.

The operation of the communications system shown in FIG. 1 is described in further detail in copending application Ser. No. 08/634,543, filed Apr. 18, 1996, which is assigned to the assignee of the instant application. That application is incorporated by reference herein in its entirety.

Figure 7:
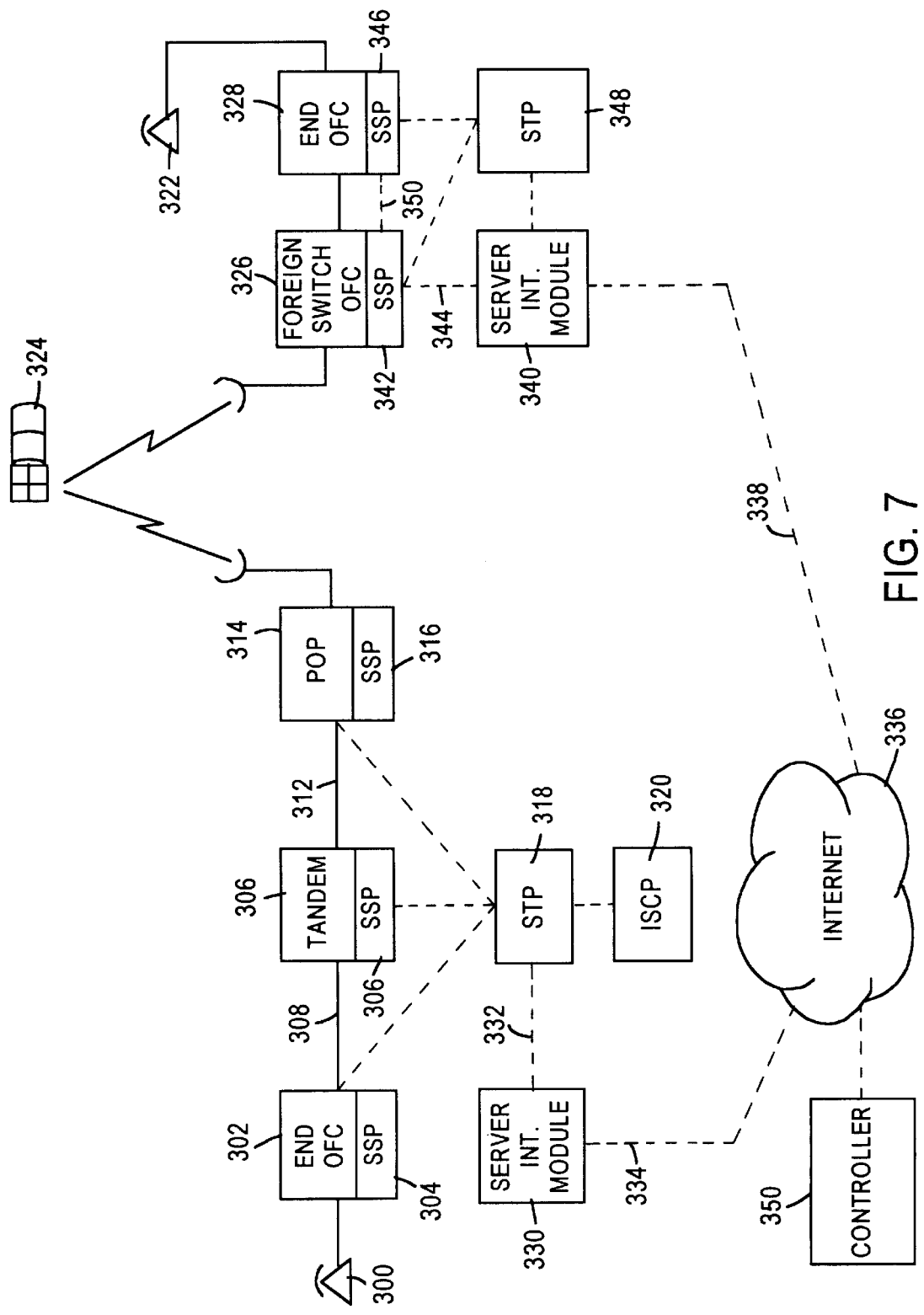
FIG. 7 is a simplified diagram of illustrating the architecture of the existing public switched telephone network (PSTN) in the United States modified to implement a transoceanic telephone communication.

FIG. 7 illustrates in simplified block diagram form the architecture of the PSTN in the United States modified to provide transoceanic Internet telephone service. The upper portion of the figure shows a simplified version of an SS7 controlled telephone network. However FIG. 7 includes features to implement end to end control signaling through a virtual link that may be accessed without construction of any new wide area network facilities.

In FIG. 7 the originating end switching office SSP 304 at switching office 302 is associated with an internetwork server module 330. This module is similar to the Internet Module or server previously described in connection with prior embodiments of communications systems providing telephone service over the Internet. The server 330 is connected by a data link 332, which may be an SS7 link, to the signal transfer point (STP) 318. The actual connection need not be to the specific STP 318 so long as the server is connected to the SS7 CCIS network of the LEC which serves the calling station 300. The server 330 is also connected by data link 334 to the world wide internetwork shown as a cloud 336. The internetwork 336 is preferably the network commonly known as the Internet. The far end of the Internet cloud as shown in FIG. 7 is connected via a data link 338 to a server module 340 which is connected to the foreign switching office 326 SSP 342 by data link 344. It is assumed that the foreign switching office is in a telephone network equipped with a common channel signaling system which provides essentially the same capabilities as the SS7 network, as is the case with the Japanese telephone system. Thus FIG. 7 shows connection to SSP 342, STP 348, and SSP 346 in the end switching office 328. Alternatively, the common channel signaling capability may be furnished by F link connection between the switching offices as shown at 350.

An example of the operation of the system is now described. When the calling party at telephone station 300 dials the number of the desired foreign party, such as the telephone station 322 in Japan, the originating end office switch 302 and SSP 304 recognizes the call as directed to another switching office, suspends the call, formulates an SS7 packet message, and sends the message to the nearest STP 318. The STP analyzes the point code information in the packet and routes the packet according to the translation table stored within the STP. That translation table recognizes the foreign prefix as one requiring modified common channel signal handling and directs the packet to the Internet Module 330 for transmission over an Internet route. The Internet Module performs the necessary address determination from the information in the packet, adds the appropriate addressing and instructional overhead to encapsulate the packet in one or more TCP/IP packets, and transmits the packet or packets on to the Internet. The Internet uses a connectionless protocol and thus if multiple TCP/IP packets are transmitted they may or may not travel the same route and may or may not arrive in the same order at the destination server or Internet Module. However the destination Internet Module 340 will perform its TCP/IP function, strip the overhead, reform the original SS7 packet and deliver it to the SS7 capable control network of the destination telephone system. That network operates in its designed manner to send the message via the foreign SS7 network to the end switching office that serves the destination telephone line, i.e., to the terminating end office 328 in the illustrated example. The terminating end office determines whether or not the called station 322 is busy. If the called station is busy, the terminating end office so informs the originating end office via SS7 signaling in the foreign CCIS network, TCP/IP signaling in the Internet, and SS7 signaling in the originating switching system. The originating end office provides a busy signal to the calling station. If the called station 322 is not busy, the terminating end office 328 so informs the originating end office. A telephone connection is then constructed via the trunks, switching offices, and satellite link between the calling and called stations.

While the illustrative call did not require a higher level of control than that available from the STP, the system is capable of providing service features which require centralized program control from a higher level control point. Such control may be obtained according to the invention either from the ISCP which controls the CCIS network of the originating telephone network or, alternatively, from a central control such as the controller 350 connected to the Internet. Such a controller may emulate an ISCP and communicate with the Internet through a server or Internet Module.

Figure 8:
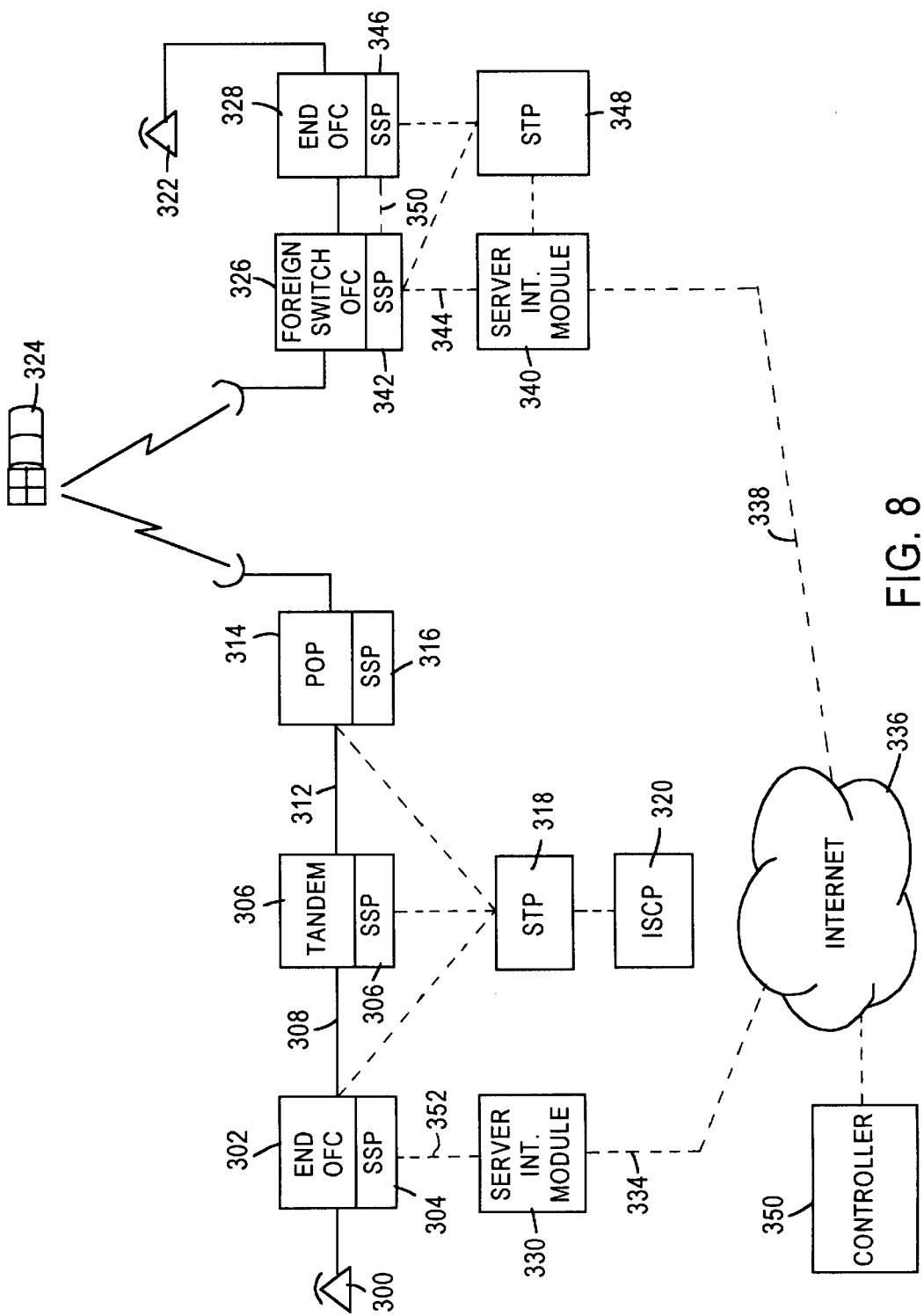
FIG. 8 is a simplified diagram illustrating another example of the architecture of the existing public switched telephone network (PSTN) in the United States modified to implement a transoceanic telephone communication.

FIG. 8 illustrates a further embodiment of a transoceanic communication system which virtually eliminates the need for reliance on the CCIS network of the originating telephone network. The network shown in FIG. 8 is similar to that shown in FIG. 7 with the difference that the link 332 between server or Internet Module 330 and STP 318 in FIG. 7 has been eliminated and a data link has been established directly from the SSP 304 for end office 302.

In operation the caller dials the number of the called station complete with the foreign prefix. The SSP 304, programmed to recognize predetermined prefixes as an action trigger, momentarily suspends processing of the call and formulates a message to be sent to the Internet Module or server 330. The query message content and format is similar to that of the message sent from the STP 318 to the server 330 in the embodiment of the invention described in connection with FIG. 7. It will include the called party's number and an indication, such as the automatic number identification (ANI), of the calling station's number. It will also include an indication of call type (here, that the call is placed to a predesignated prefix and is to be handled via Internet signaling). This provides the Internet Module or server with an indication of the treatment the call is to receive. The Internet Module thereupon processes the message in the manner described in detail in connection with FIG. 7. If the called party is available a voice connection is set up. If the called line is busy a busy signal is provided to the calling party.

The foregoing networks described in connection with FIGS. 7 and 8 are described in further detail in copending application Ser. No. 08/710,594, filed Sep. 20, 1996, and assigned to the assignee of the instant application. That copending application is incorporated herein by reference in its entirety.

Figure 9:
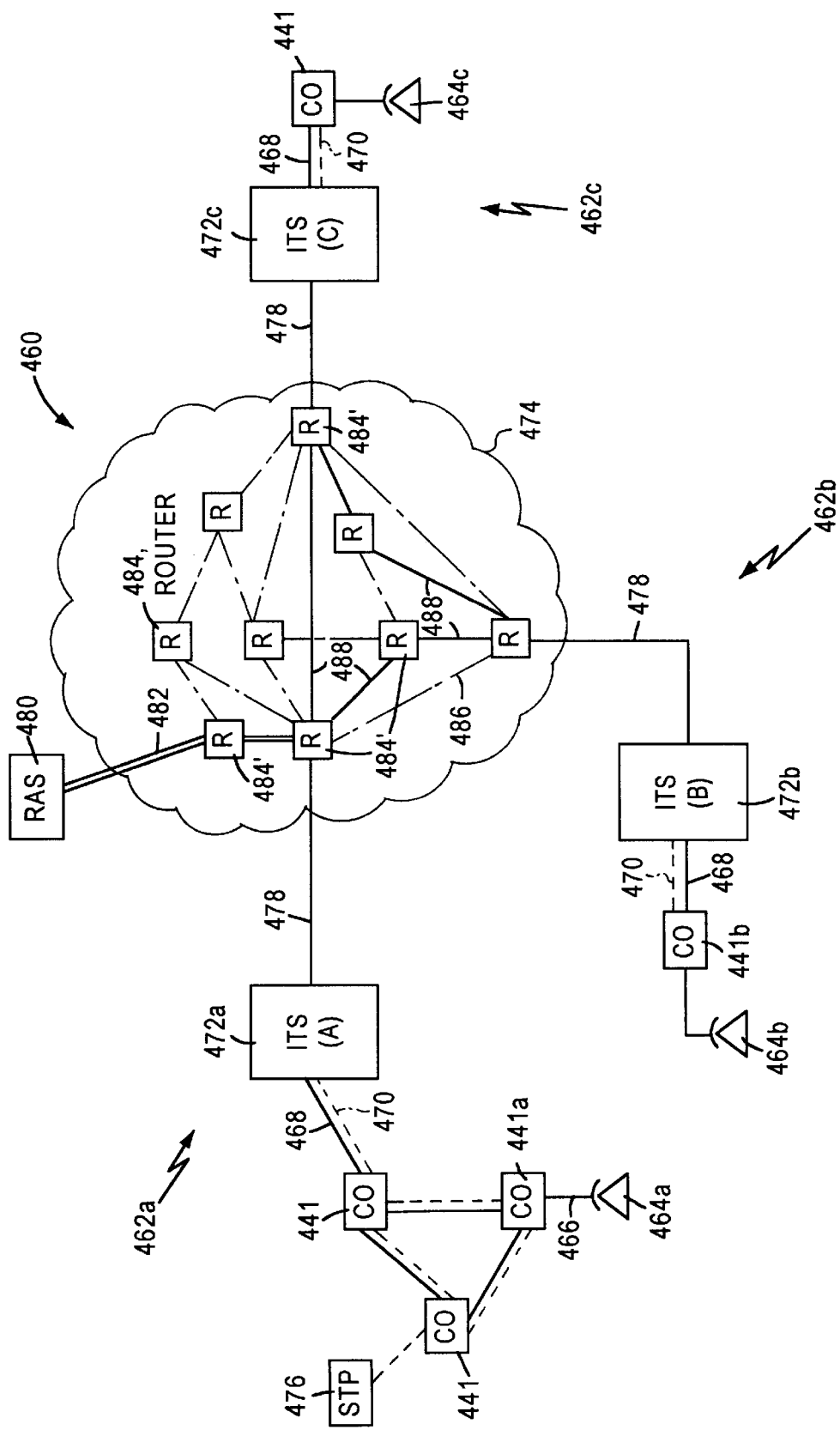
FIG. 9 illustrates another arrangement for public telecommunications systems to provide long distance telephone service over the Internet.

Referring to FIG. 9 there is shown another arrangement for public telecommunications systems to provide long distance telephone service over the Internet. The telecommunications system includes a plurality of switched telecommunications networks 462A, 462E, and 462C operating in different geographical regions. For example, each telecommunications network 462 may be a public switched telephone network such as a Regional Bell Operating Company (RBOC), or a private communication network having a limited service area. Each network 462 has at least one assigned number code, such as an area code, that uniquely identifies service areas of that network. Each network 462 also includes a plurality of interconnected switching systems 441 serving customer premises terminals 464 via local loop connections 466. Each network 462 also includes trunk lines 468 and signaling lines 470 that support the interoffice signaling for the particular network.

Each telephone system 462 also includes an Internet telephony server (ITS) 472 that provides an interface between the corresponding telephone system 462 and the wide area packet switched network 474, for example the Internet. The ITS is similar to the Internet Module or server described above with respect to the preceding embodiments of Internet telephone service. The ITS 472A is typically connected to a local central office 441 via a standard voice grade line or trunk connection 468, for example a T-1 or T-3 connection. Alternatively the hardware associated with the ITS 472A may be situated at the central office 441 and associated with the switching system.

The ITSs 472 include signaling capabilities, for example SSP capabilities, and are connected into the CCIS network as indicated by the links 470 to the illustrative STP 476. The SSPs serving the corresponding ITS 472 are inter-connected with the central office SSPs and CCIS network. The ITSs may be linked for signaling purposes by conventional F links. The Internet Modules are connected to the Internet 474 by T1/T3 trunks 478.

Figures 13A, 13B, 13C:
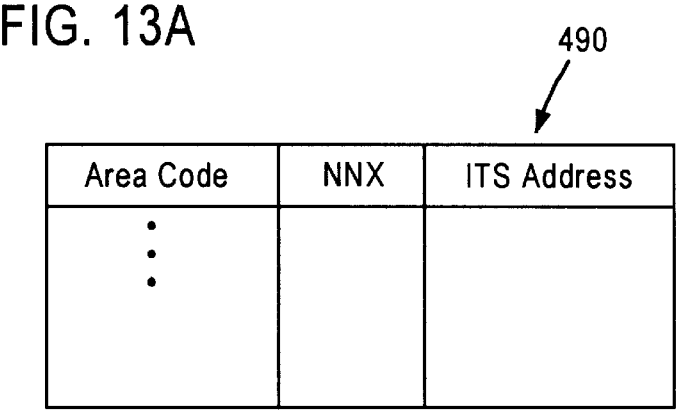
FIGS. 13A, 13B and 13C are diagrams illustrating tables stored in the routing and administration database of FIG. 9.

The system 460 also includes a routing and administration server (RAS) 480 that includes a routing and administration database for managing call routing translations and user access permissions. The RAS 480 is shown as an Internet node having a dedicated virtual path 482, described below. The routing and administration database stores records for every area code/NNX served by a telephony system 462, along with the network address for the corresponding ITS 472. FIG. 13A is a diagram illustrating the stored records of the routing and administration database of the RAS 480 stored in a translation table 490. The translation table 490 stores for each area code and central office code (NNX) the IP address of the corresponding ITS 472, also referred to as the ITS address. The routing and administration database in the RAS 480 thus stores all area codes serviced by a given telephone system 462A, as well as the Internet address identifying the point of presence (POP) for the serving ITS 472A. Hence, the RAS 480 serves as a pointer to identify a destination Internet telephony server 472 based on the area code of the called station. If a telephone system 462 includes a plurality of ITSs 472 within a selected area code, then the translation table 490 provides the unique IP address based on the area code and central office code being accessed.

For example, the ITS 472C processes a telephone call for called party 464A initiated by the calling party 464C by sending a routing request to the RAS 480. The routing request will include the area code of the called party 464A. The RAS 480 accesses the internal translation table 490 to determine the ITS address corresponding to the area code of the called party. If the destination telephone network ha s a plurality of internet telephony servers within a n area code, the RAS 480 may send to the ITS 472C a signaling message requesting the central office code (NNX) as well. Once the RAS 480 has sufficient information to identify the specific ITS 472A serving the called party 64a, the RAS 480 sends the IP address of the ITS 472A serving the specified area code to the ITS 472C. The ITS 472C in response sends signaling and/or voice traffic to the ITS 472A by outputting data packets having the IP address of the ITS 472A as a destination address. Once received by the ITS 472A, the signaling and/or voice traffic is recovered from the payload of the data packets and processed by upper-layer protocol to establish the communication link between the calling station 464C and the called station 464A via the Internet.

A particular aspect of this embodiment is the use of dedicated virtual paths established in the Internet 474 to maintain a prescribed service level, i.e., quality of service, for the calling party. Specifically, the Internet 474 includes a plurality of routers 484 that route data packets along available paths 486 based on known algorithms. As known in the art, the separate packets that constitute a message may not travel the same path 486 depending on traffic load. However they all reach the same destination and are assembled in their original order in a connectionless fashion.

In order to provide guaranteed service quality during long distance telephone calls via the Internet, the data packets can be transported on dedicated virtual paths at a minimum guaranteed bandwidth and latency, for example 28.8 kbps per telephone call in each direction. The disclosed embodiment establishes dedicated virtual paths 488 for large-scale transport of packets carrying long distance traffic to different telephone systems 462. Specifically, selected routers 484' reserve a predetermined amount of bandwidth, for example, twenty percent of the overall capacity, for virtual paths for use by the RAS and the ITSs 472 in transporting voice and signaling data. FIG. 14 is an example of an internal matrix table 492 in one of the routers 484', where the router 484' receiving a data packet from a source node (i.e., another router) outputs the received data packet to a predetermined destination node based on the destination IP address in the data packet. As shown in FIG. 14, the router reserves a 51.8 MB/s (OC-1) path between source and destination nodes IP1 and IP2 for packets having a destination address corresponding to the ITS (B) 472B. Hence, assuming a router 84' has a capacity of switching up to 466.56 MB/s (OC-9), the router can reserve one virtual path at 51.8 MB/s (OC-1), another path at 44.7 MB/s (DS-3), and a third virtual path at 155.5 MB/s (OC-3) between two nodes.

Hence, a complete virtual path having a predetermined bandwidth between two ITSs 472 can be established by forming a sequence of routers, each having predetermined path segments for transporting data packets along the virtual path to the next router or node. The virtual path is initially arranged by contracting with the Internet service provider controlling each router 484' in the desired virtual path. The ISP will then program the router 484' and any associated autonomous system (AS) with the table 492 to guarantee the desired bandwidth along the virtual path.

Once the sequence of routers has been established, the end-to-end virtual path (POP(1) to POP(2)) is stored as a virtual path lookup table 494 in the RAS 480 database, along with the total available bandwidth, shown in FIG. 13B. The RAS 480 also monitors unused bandwidth by allocating bandwidth for each routing request. Hence, the RAS 480 is able to monitor traffic along a virtual path to determine whether a data rate in a communication link should be changed. If the RAS 480 determines that a virtual path has little traffic, then the RAS may specify a higher data rate for the communication link. However, if the RAS 80 determines that a large amount of traffic exists on the virtual path, then the data rate may be reduced to the minimum guaranteed service level stored in the RAS 480 database for the calling number, shown in FIG. 13C.

An alternate arrangement for providing a communication link according to a prescribed service level involves using Internet Protocol, version 6 (IPv6). IPv6 incorporates a variety of functions that make it possible to use the Internet for delivery of audio, video, and other real-time data that have guaranteed bandwidth and latency requirements. Hosts can reserve bandwidth along the route from source to destination. Hosts can specify loose or strict routing for each hop along a path. In addition, packets are assigned a priority level, insuring that voice or video transmission is not interrupted by lower priority packets.

As shown in FIG. 9, a group of virtual paths 488 enable transmission of signaling and traffic data between the ITSs 472A, 472B and 472C via the Internet at prescribed service levels. Signaling information between the ITSs 472 and between an ITS 472 and the RAS 480 will typically be given highest priority. Service levels for subscribers at calling stations 464 are typically arranged at different levels, depending on subscriber preference and cost. Once a service level for a subscriber is established, the guaranteed service level is stored in the RAS 480 database. Alternately, an image of the routing and administration database in the RAS 480 may be stored in the ITS 72 to reduce access via the Internet.

Figure 10:
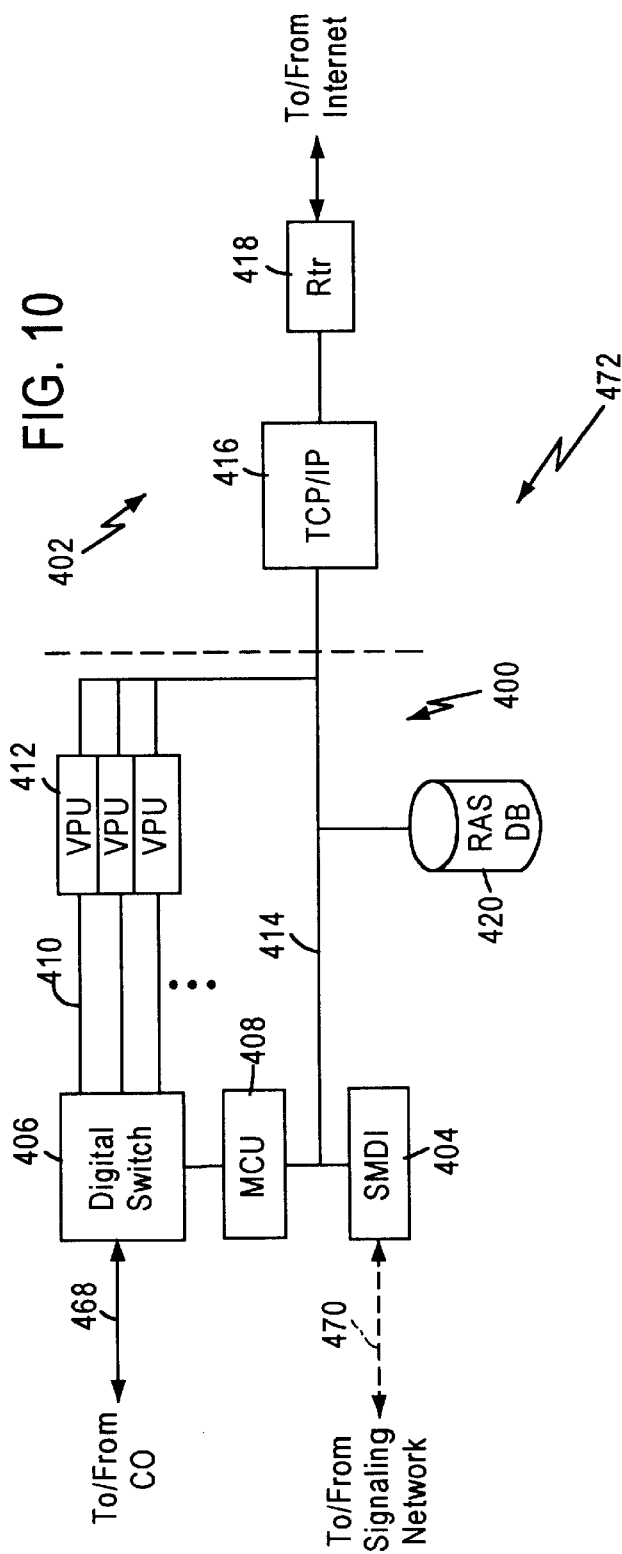
FIG. 10 is a block diagram of the server of FIG. 6.

FIG. 10 is a block diagram of the ITS 472 of FIG. 9. The ITS 472 includes a telephony platform 400 and an Internet server platform 402. The telephony platform 400 performs basic telephony functions, including incoming call detection (ringing, trunk seizure, etc.), call supervision/progress detection (busy tone, disconnect, connect, recorded announcement, dialtone, speech, etc.), call origination, DTMF, call termination, call disconnect, switch hook flash, etc.

As shown in FIG. 10, the telephony platform 400 of the ITS 472 includes a simplified message desk interface (SMDI) 404 that sends and receives signaling data to the CCS signaling network, a digital switch 406 that sends and receives communication traffic from the trunk line 468, a master control unit (MCU) 408 that controls the overall operations of the ITS 472, including controlling the switch 406 to separate data traffic on the trunk line 468 into single 64 kb/s data channels 410. The data on each of the data channels 410 is compressed by a voice processor unit (VPU) 412 into compressed communication data having a data rate of approximately 16 kbit/s or lower. The compressed communication data may be either voice data or other data, for example facsimile data.

The compressed communication data is output to a local area network (LAN) 414, for example an Ethernet-based network at 100 Mbit/s. The LAN 414 carries data signals between the MCU 408 and the voice processing units 412. The system also includes Tl type digitized audio links 410 between the switch 406 and each of the VPU's 412. The LAN 414 transports data packets to a packet assembler/disassembler (PAD) 416 that packetizes data on the LAN 414 into TCP/IP packets for transport onto the Internet 474. The PAD 416 also recovers signaling and communication data from data packets received by the router 418. Hence, the PAD 416 receives signaling information from the SMDI 404 originated from the signaling network 470, and outputs signaling data recovered from data packets received from the Internet 474 to the SMDI 104 for subsequent call processing via the signaling links 470.

The ITS 472 also may include a RAS database 420 that is an image of the database in the RAS server 480. The RAS database 420 enables translation information to be obtained without accessing the RAS 480 via the Internet 474. In this arrangement, the ITS 472 would monitor its own bandwidth allocation as stored in the RAS database 420.

The router 418 is of the type now generally used in Internet practice. If desired, the router 418 may also be connected to a Domain Name Service (DNS) server and a Dynamic Host Configuration Protocol (DHCP) server of the type conventionally used by Internet Service Providers in existing Internet Service.

Figure 12A:
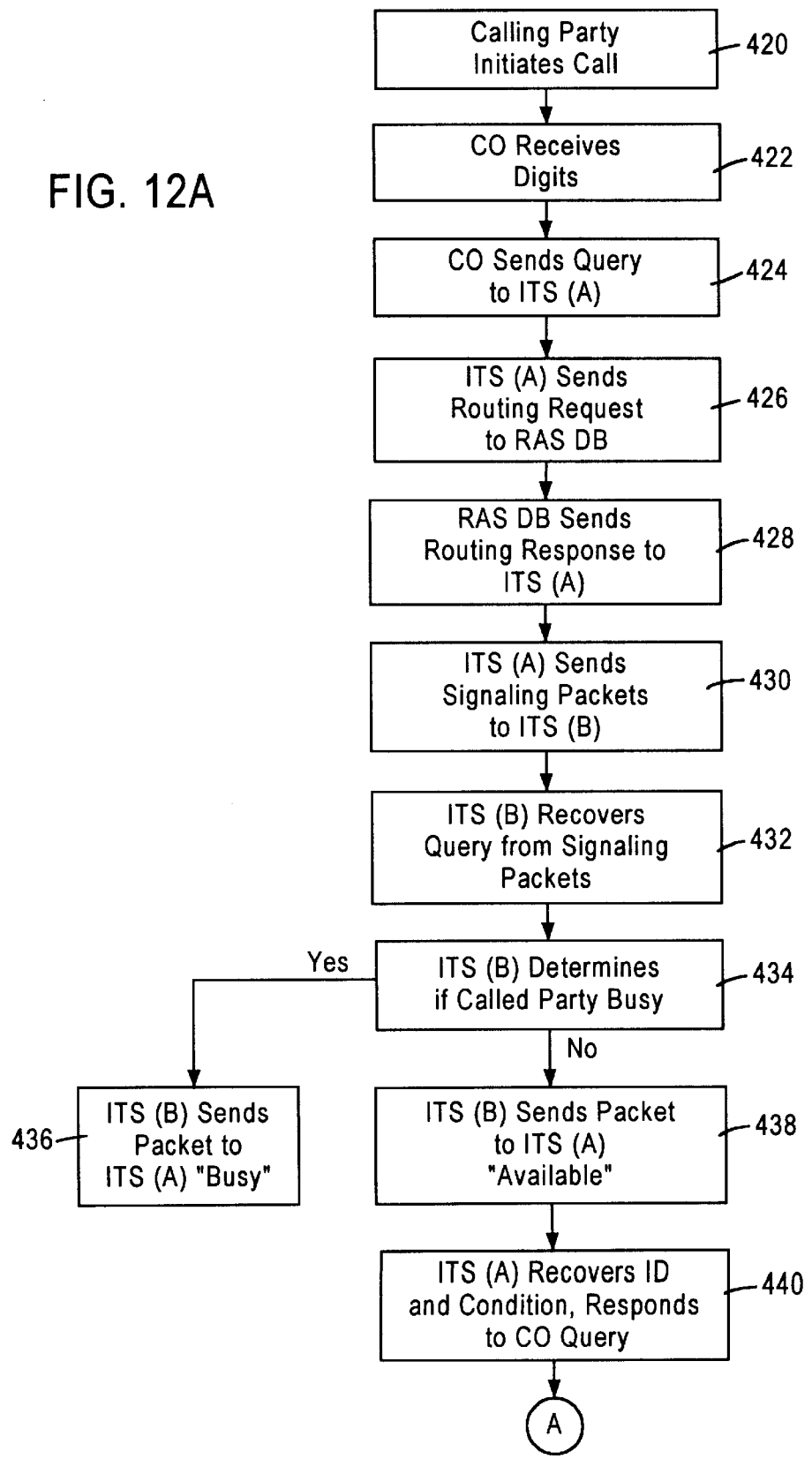
FIGS. 12A and 12B are flow diagrams summarizing a method of establishing long distance service according to an embodiment of the present invention.

An exemplary call using the arrangements of FIGS. 9 and 10 will now be described with respect to FIGS. 12A and 12B. The system of FIG. 9 establishes an Internet connection to link a calling to a called telephone without the necessity of either party possessing or using personal or office computer equipment. The subscriber in this example uses the POTS station 464A to initiate an Internet call to a called party at the POTS station 464B in step 420. The caller goes off-hook and dials *82. As previously explained, this prefix has been established by the Telco offering the service as a predesignated prefix with which the public may initiate an Internet telephone call. The dialing of the prefix *82 is followed by the dialing of the directory number of the called party at the station 464B including the area code.

The central office switching system responds to the off-hook and receives the dialed digits from the calling station in step 422. The central office switching system analyzes the received digits and determines from the prefix *82 that the call is an Internet call. Responsive to its programming it knows that the call must be completed through a remote central office and that further processing is necessary. The originating central office 441A suspends the call and sends a CCIS query message in step 424 to the ITS 472A via the signaling channel 470.

In response to the query message, the ITS 472A identifies the internet telephony server servicing the called party 464b by sending in step 426 a routing request, including the number of the calling party 464A and the area code of the called party 464B, to the RAS 480 via the Internet 474. Alternately, the ITS 472A may access its own internal routing and administration database 420, shown in FIG. 10, which is an image of the routing and administration database in the RAS 480. The routing and administration database (RAS DB) accesses the internal translation tables, shown in FIGS. 13A and 13C, and sends a routing response in step 128. The routing response includes the identity (e.g., IP address) of the ITS 72b serving the called party 64b, the predetermined virtual path between the two servers, and the minimum guaranteed service level for the calling station 464A.

The ITS 472A then sends in step 430 a signaling message in the form of a query message packetized in TCP/IP packets having the IP address of the ITS 472B as the destination address. The signaling packets are received via the virtual paths 488 by the ITS 472B in step 432 and include a session ID, the called number, the calling number, and the requested data transmission rate having a minimum data rate corresponding to the prescribed service level. The ITS 472B recovers the query message from the payload of the TCP/IP packets in step 432, and determines whether or not the called station 464B is busy in step 434.

If the called station 464B is busy, the receiving central office 441B so informs the ITS 472B via the signaling network 470, and the ITS 472Bb returns a busy message to ITS 472A in step 436 using signaling packets in TCP/IP protocol. The ITS 472A recovers the busy message from the received data packets via the Internet 474, and informs the originating central office via the signaling network 470 of the busy condition. The originating central office provides a busy signal to the calling station.

If the called station is not busy, the receiving central office 441B busies out the called station line 464B by blocking all calls. The receiving or destination central office 441B then informs the originating central office 441A via the ITS servers 472B and 472A and the Internet that the called line is available and waiting. Specifically, the ITS 472B in step 438 sends a data packet including the session identifier and the available condition of the called party 464B to the ITS 472A via the Internet. The ITS 472A recovers the signaling information including the session ID and available condition from the data packet transmitted by the ITS 472B, and responds in step 440 to the query from the originating central office 441A.

Figure 12B:
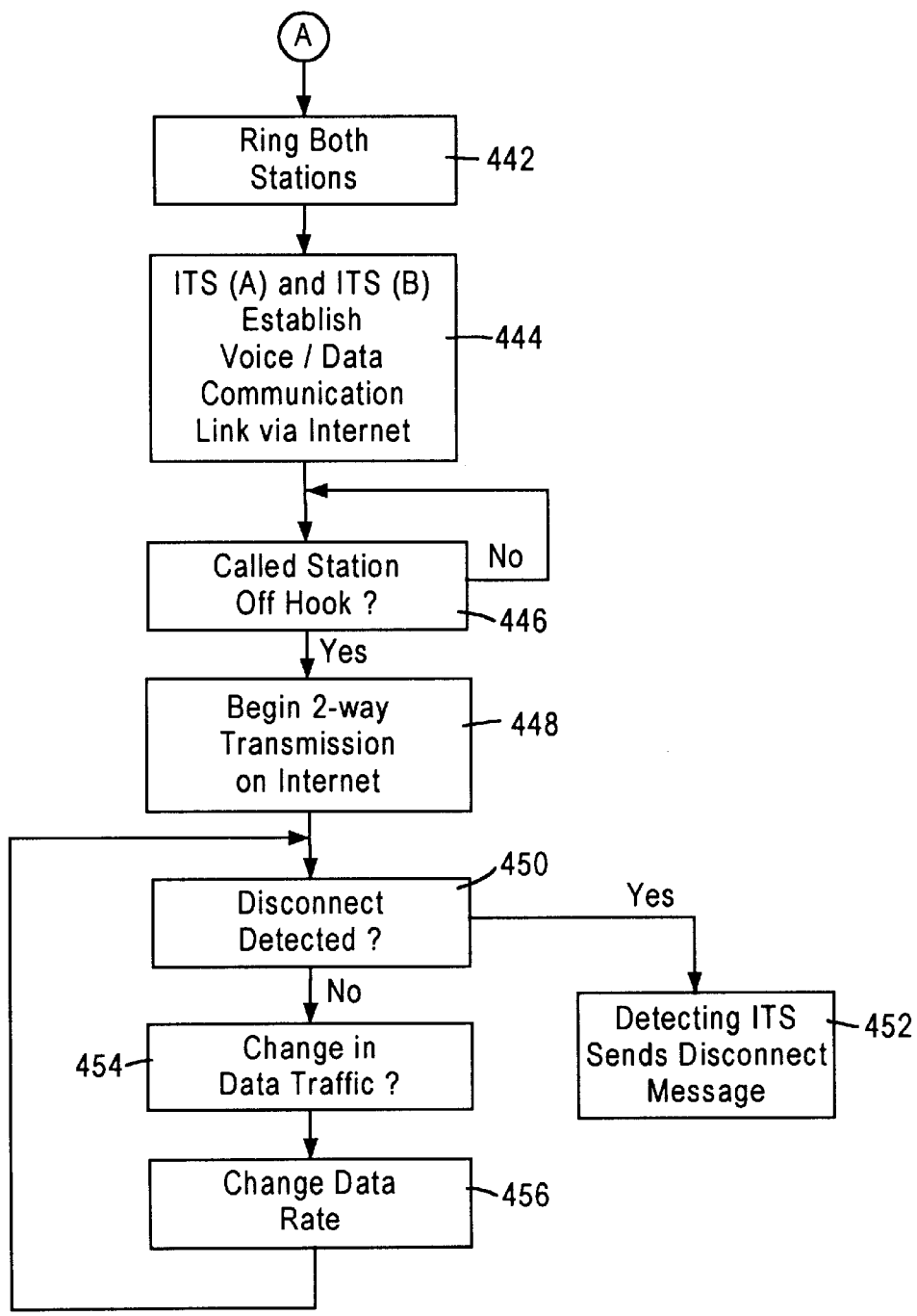

Referring to FIG. 12B, an Internet virtual connection is then established between the calling and called stations. The receiving or destination central office 441B provides a ringing signal to the called station 464B and the originating central office 441A sends ringback tone back through the local loop 466 to the calling station 464A in step 442. At the same time, the ITS 472A and the ITS 472B establish a two-way communication link on the predetermined virtual path at the prescribed service level in step 444. Specifically, the initial packets transmitted by each ITS 472 will have identification information for the destination switches. Alternately, each ITS 472 will use the reserved voice path connections for transmitting voice data packets. When the called station 464B goes off-hook in step 446 and the Internet virtual connection is completed the conversation via the Internet can commence in step 448.

Each of the ITSs 472A and 472B monitor the communication link to detect a disconnect in step 450. If a disconnect condition is detected by one of the ITSs 472 in step 450 via a signaling message from the corresponding central office 464, then the ITS 472 sends a disconnect message as a signaling data packet to the corresponding ITS 472 via the Internet 474 in step 452.

In addition, the ITSs 472A and 472B and the RAS 480 monitor the traffic on the established virtual communication path. If any of the ITSs 472A or 472B or the RAS 480 detects a substantial increase or decrease in traffic, the detecting node outputs a signaling data packet indicating the detected change to the corresponding ITSs 472A and/or 72b. If in step 454 a signaling data packet is received indicating a detected change in the traffic on the virtual communication path 488, the ITS servers 472A and 472B in step 456 change the data rate based on the received data rate value in the signaling data packet and in accordance with the prescribed service level.

Figure 11:
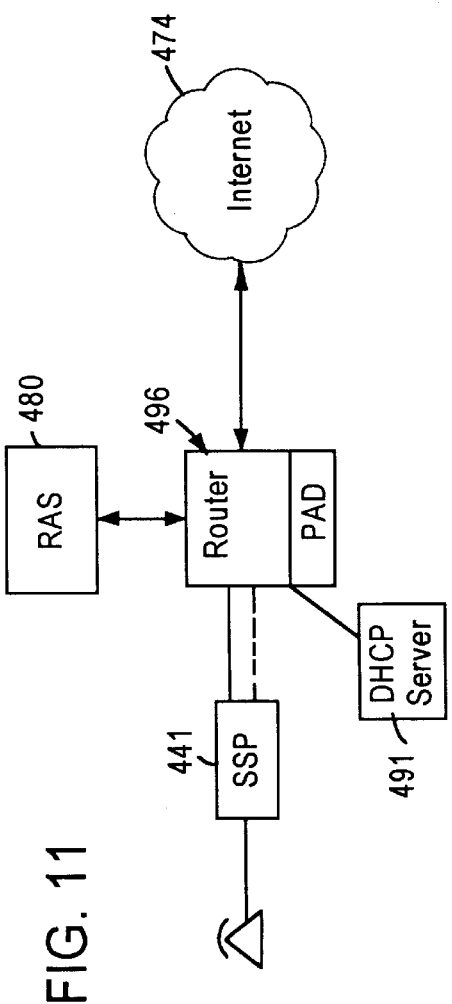
FIG. 11 is a block diagram illustrating an alternate architecture for providing long distance telephone service via public switched telephone networks and the Internet.

FIG. 11 is a block diagram of an alternate implementation of Internet long distance service, where an internet module 496 including a router handles routing of low-grade Internet telephone calls using conventional compression and routing techniques. For example, the originating central office 464 may send a CCIS message to the Internet Module 496 including the directory numbers of the calling station and the called station and requesting establishment of an Internet connection (or virtual connection) between the two.

The router in the Internet Module 496 may then react to receipt of that CCIS signal and request the temporary assignment of Internet addresses for the processors associated with the respective central offices. Upon completion of the assignment of the addresses module 496 may send a CCIS signal to the originating central office advising of that fact. When the originating central office receives the message that the addresses have been assigned the switching system connects the originating local loop to the Internet Module 496.

The Internet Module router then sends a request for the assignment of temporary IP addresses for the two directory numbers to a DHCP server 491. The DHCP server hears the message and offers an IP address for each directory number for a certain time period which may be determined by the router or the server. The router may request a specified time period and the DHCP server may decline and offer a longer or shorter period, seeking mutual agreement. Upon agreement the addresses are accepted and assigned. The originating Internet Module 496 next triggers a CCIS message to a destination Internet Module (not shown) which includes the temporary IP address assigned to the called directory number and associated processor.

The transmission of data packets through the Internet using the Internet module 496 and the DHCP server 491 does not guarantee bandwidth or a minimum latency. Hence, if the Internet module determines that the calling station is a subscriber that requests high priority traffic, the Internet module 496 accesses the RAS 480 instead of the DHCP server 491 in order to obtain a predetermined communication path reserved for guaranteed bandwidth and latency, as described above with respect to FIG. 9. Hence, the Internet module 496 performs the functions of the ITS 472 upon detecting a calling station having a prescribed service level that requires a guaranteed bandwidth by obtaining the routing information from the RAS 480.

According to the present invention, routing and administration servers provide translation addresses for servers acting as interfaces for public telephone networks. The Internet telephone servers are thus able to determine the network address of a destination server based on the area code of a called station. The servers then establish a communication link via the Internet and use higher level protocol to divide and distribute voice calls through the respective telephone systems. Hence a plurality of communications links can be established between two servers while minimizing the number of hosts on the Internet.

In addition, servers exchanging communications traffic via a wide area packet switched network can maintain a guaranteed quality of service by reserving predetermined virtual paths throughout the packet switched network. The predetermined virtual paths thus ensure a guaranteed bandwidth and latency for quality long distance service.

Figure 15:
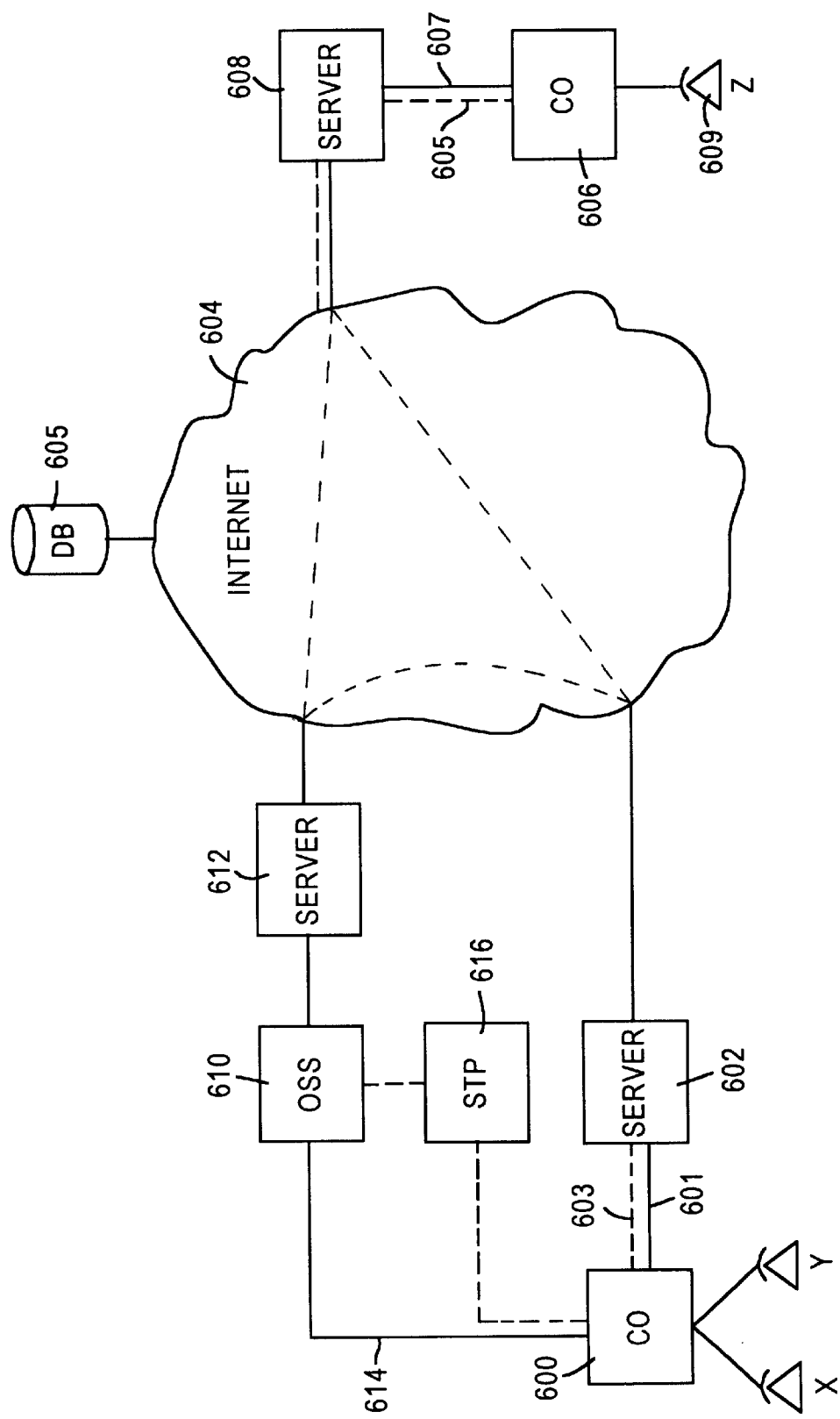
FIG. 15 is a diagram of an exemplary telecommunications network for providing Internet telephone service with directory assistance according to one embodiment of the invention.

Referring to FIG. 15 there is shown the architecture for a telecommunications network arranged to provide Internet telephone service with directory assistance and call completion services. According to the invention these added services are provided in the Internet environment in a manner that is transparent to the calling party. Thus, a calling party who has requested an Internet telephone connection may also receive directory assistance and call completion services in the same manner as the party is accustomed to access those services from the public switched telephone network.

FIG. 15 shows an overall telecommunications-Internet network of the same general type as discussed in detail above with respect to FIGS. 1–14. For purposes of description, the simplified network is shown as comprising a central or end office switching system 600 connected to an Internet server or module 602 by a line 601 and a data link 603. The Internet server is connected to the Internet 604. At the other side of the illustrated Internet there is provided a second central or end office switching system 606 connected via data link 605 and line 607 to a second Internet server or module 608. The server 608 is connected to the Internet 604. The central office (CO) 600 is connected by local links to subscriber stations X and Y. The central office (CO) 606 is connected by a local link to subscriber station Z.

An operator service system (OSS) 610, presently to be described in detail, is connected to the Internet 604 through a server or Internet module 612. The OSS is also connected to the CO 600 by a trunk 614 which may be a Feature Group D trunk or a tandem trunk. In the latter instance signaling may be provided by one or more STPs 616. The server 612 may also have SSP capability and be connected to the STP 616. It will be appreciated that while only the CO 600 is shown in this illustration, it is representative of one CO in a telephone network having CCIS using SS7 and AIN control. The same is true with respect to the CO 606.

Figure 16:
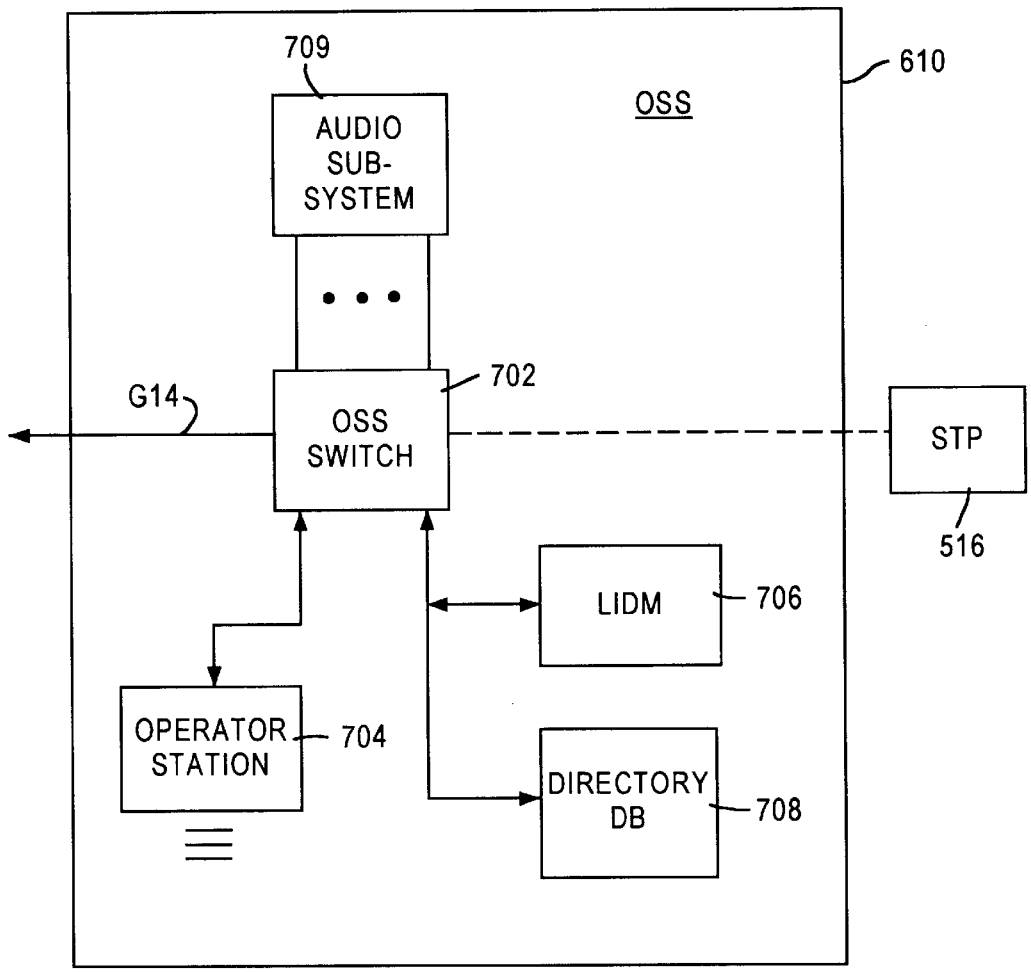
FIG. 16 is a diagrammatic illustration of the operator service system (OSS) of FIG. 15.

Referring to FIG. 16 there are shown details of the OSS. The OSS 610 may be the same operator services and directory assistance facility that the LEC which operates the network including CO 600 uses for providing operator services and directory assistance for its own intra-LATA calls, but that is preferably not the case in this embodiment of the invention. Here the OSS 610 is preferably dedicated to the provision of operator services for Internet calls as described herein. Conventionally, the OSS 610 includes an operator services switch 702, a number of operator stations, such as station 704 (manual or automated) connected to the switch 702, and a plurality of peripheral databases and billing subsystems as required for complete operator services (all of which are not specifically illustrated). Pertinent to the present discussion, however, is the line information database (LIDB) 706, which provides current data relating to particular customer telephone lines, and the directory database 708.

The operator services switch 702 permits the operator station 704 to access data from the two databases 706 and 708 for use in processing operator serviced calls. The OSS 610 also includes an audio subsystem 709 connected to the switch 702 for the provision of prompts and other audio messages, and to facilitate voice communications with a caller. As previously stated, the OSS 610 is also connected to a signaling network, such as the SS7 network represented by STP 616 shown in both FIGS. 15 and 16.

Figure 17A:
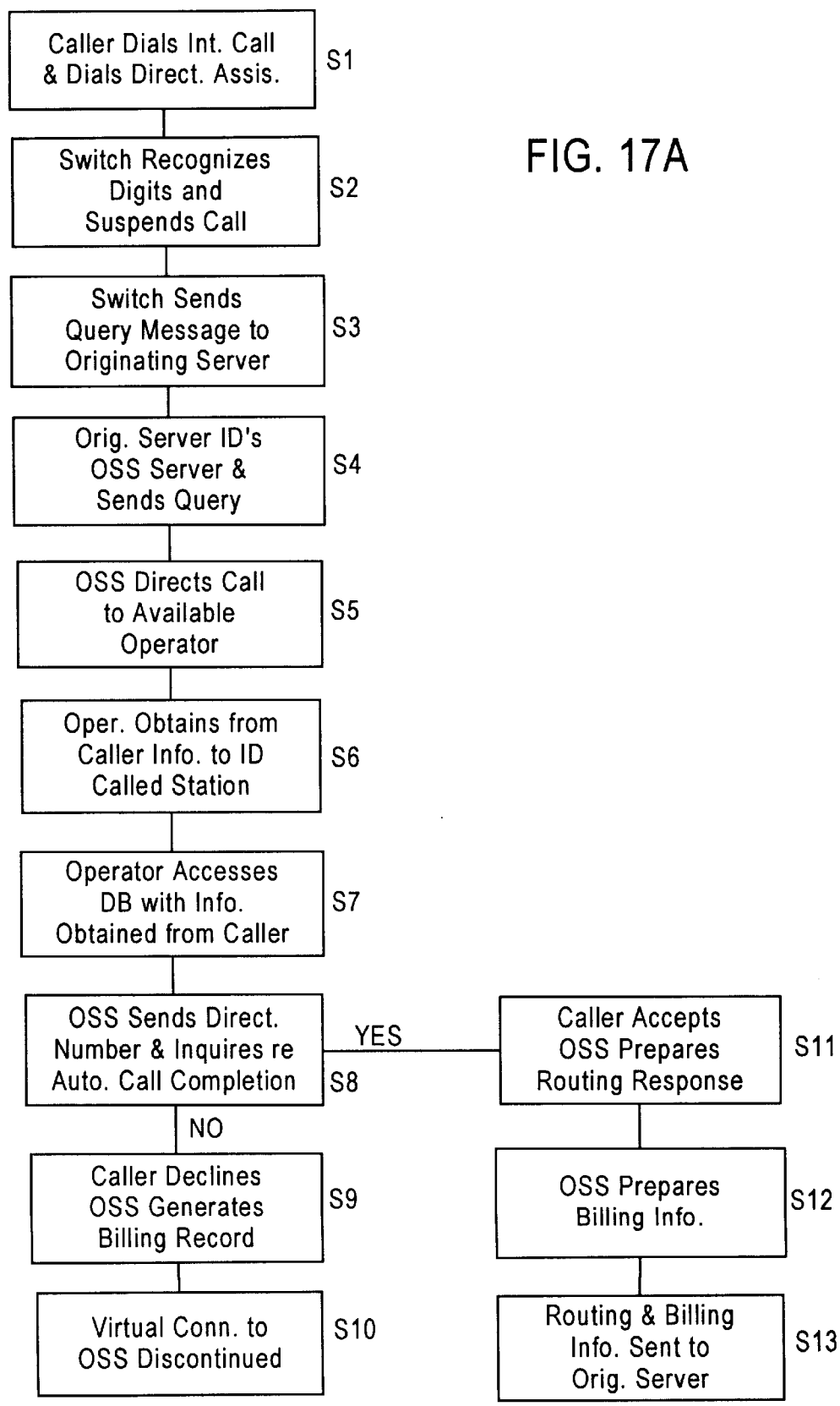
FIGS. 17A, 17B, and 17C are flow diagrams illustrating one mode of operation of the system of FIG. 15.
Figure 17B:
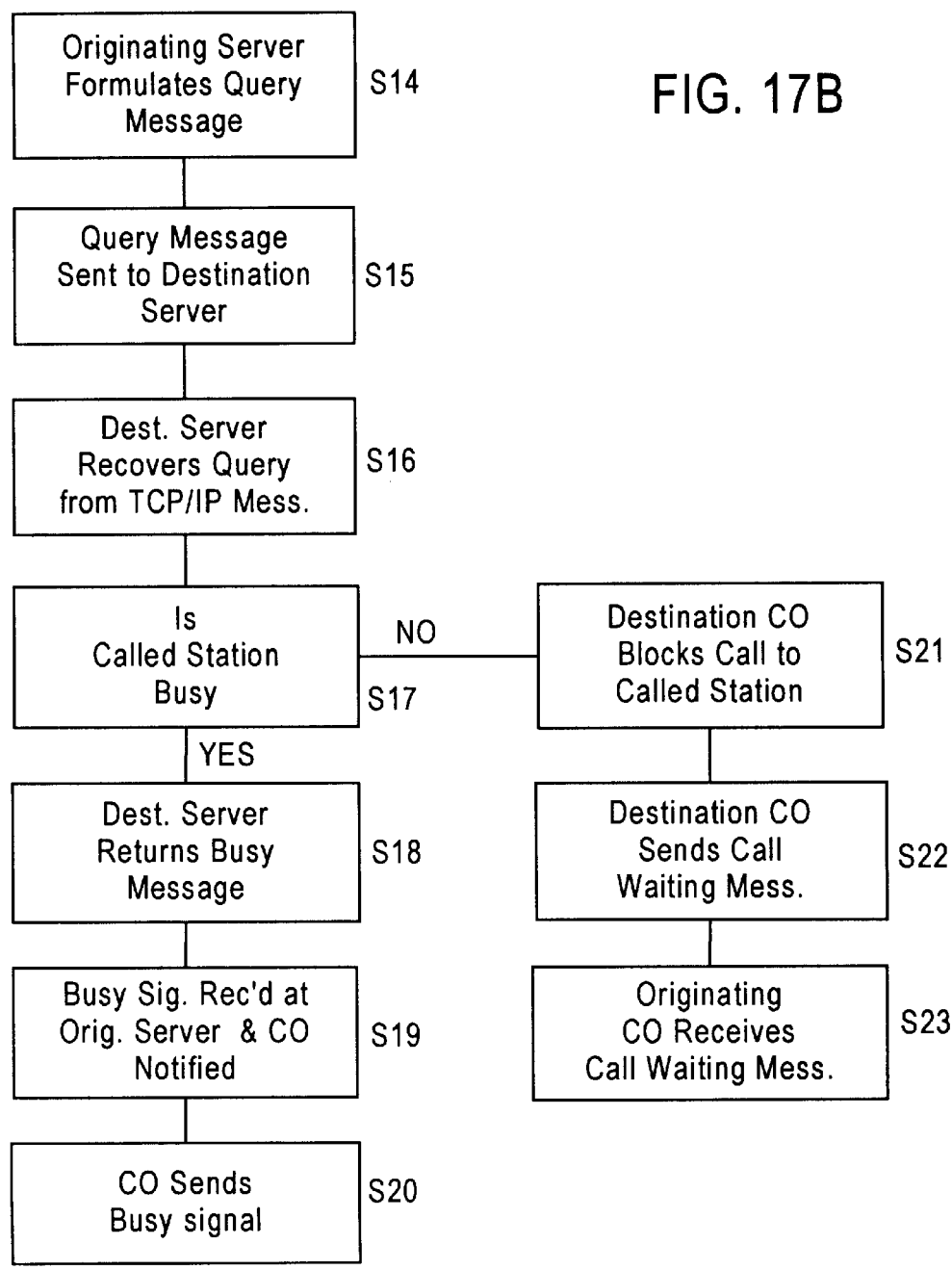

An exemplary call using the arrangements of FIGS. 15 and 16 will now be described with respect to FIGS. 17A and 17B. In operation, a caller at station X, assumed to be in Alexandria, Virginia, seeks to make an Internet call to a station in San Jose, Calif. (assumed to be station Z), using directory assistance. The caller dials *82 followed by the conventional directory assistance calling procedure number, in this instance 408-555-1212. This is shown at S1 in FIG. 16A. As previously described, the prefix *82 has been established by the Telco offering the Internet service as a designated prefix with which the public may initiate an Internet telephone call.

The central office switching system 600 responds to the off-hook and receives the dialed digits from the calling station in step S2. The central office switching system analyzes the received digits and determines from the prefix *82 that the call is an Internet call. Responsive to its programming it knows that the call must be completed through a remote central office and that further processing is necessary. Also responsive to its programming it knows that the call is a directory assistance call. While the point in call (PIC) in the foregoing example was NPA (area code) 555-1212, it may also be 411 or simply 555-1212. In response to the PIC the originating central office 600 suspends the call and sends a CCIS query message to the Internet server 602 via the signaling channel 603. This is shown in step S3.

In response to the query message, the originating Internet server 602 identifies the internet telephony server which services the OSS 610. This is accomplished in step S4 by sending a directory assistance routing request, including the number of the calling party X and the area code of the called party (408). This request is sent to the OSS 610 through the Internet via originating server 602 and the OSS Internet server 612 as shown by the broken line through the Internet 612. At step S5 the OSS switch 602 switches the call to an idle directory assistance operator position terminal 704. The operator thereupon handles the call using current voice conversation methods, i.e., to obtain information to permit identifying a particular directory listing (step S6).

In accomplishing this the operator accesses the OSS directory database 608 at step S7. Alternately, the OSS may access the central directory database 605 or any available database which is indicated to possess the desired information. It will be understood by those skilled in the art that such databases may be arranged hierarchically so that a database search proceeds from one to the other in the manner of domain name databases. The connections between databases and between the OSS and the databases is made in the OSS for its local database and preferably through the Internet for further connections.

The database which is utilized accesses its internal translation tables and returns the requested information. At step S8 the OSS, having the information, sends an Internet voice response giving the directory number to the caller. As a terminal portion of this response there is an inquiry as to whether or not the caller desires to have the Telco automatically dial the retrieved number. The caller makes this decision at step S9. If the caller declines, the automatic dialing the OSS switch generates a billing record for the directory assistance at step S9. The virtual connection through the Internet is then discontinued at step S10 and the directory assistance has been rendered and is complete.

If the caller accepts the offer of automatic dialing, the OSS formulates a routing response for the originating server 602 in step S11. The routing response includes the directory number of station Z and the identity (e.g., IP address) of the server 608 serving the called station Z. The response also includes information as to any predetermined virtual path between the two servers, and the minimum guaranteed service level (or default level) for the calling station X. At S12 the OSS switch generates a billing record for the directory assistance and includes this information with the routing data for storage and usage by the originating server 602. The routing message and billing information are sent to the originating server 602 at step S13. When the response message is received by the originating server that server attempts to set up the Internet call as illustrated in the flow chart 17B.

Referring to that figure, the server 602 sends a signaling message in the form of a query. The query message is packetized in TCP/IP packets having the IP address of the destination server 608 as the destination address. This is shown at step S14. The signaling packets are received via the virtual path indicated by the broken line to the destination server 608 in step S15. This message includes a session ID, the called number, the calling number, and the requested data transmission rate having a minimum data rate corresponding to the prescribed service level. The destination server recovers the query message from the payload of the TCP/IP packets in step S16. In step S17 the destination server determines whether or not the called station Z is busy.

If the called station Z is busy, the receiving central office 606 so informs the destination server 608 via the signaling network 605. In step S18 the server 606 returns a busy message to the originating server 602 using signaling packets in TCP/IP protocol. The originating server 602 recovers the busy message from the received data packets via the Internet, and informs the originating central office 600 of the busy condition via the signaling network 603 at step S19. The originating central office provides a busy signal to the calling station at step S20.

If the called station is not busy, the receiving central office 606 busies out the called station line 609 by blocking all calls at step S21. The receiving or destination central office 606 then informs the originating central office 600 via the Internet and servers 608 and 602, that the called line is available and waiting. This occurs at step S22. Specifically, at step S22, the server 608 sends a data packet including the session identifier and the available condition of the called party Z to the server 602 via the Internet. The server 602 recovers the signaling information including the session ID and available condition from the data packet transmitted by the server 608, and responds in step S23 to the query from the originating central office 602.

Figure 17C:
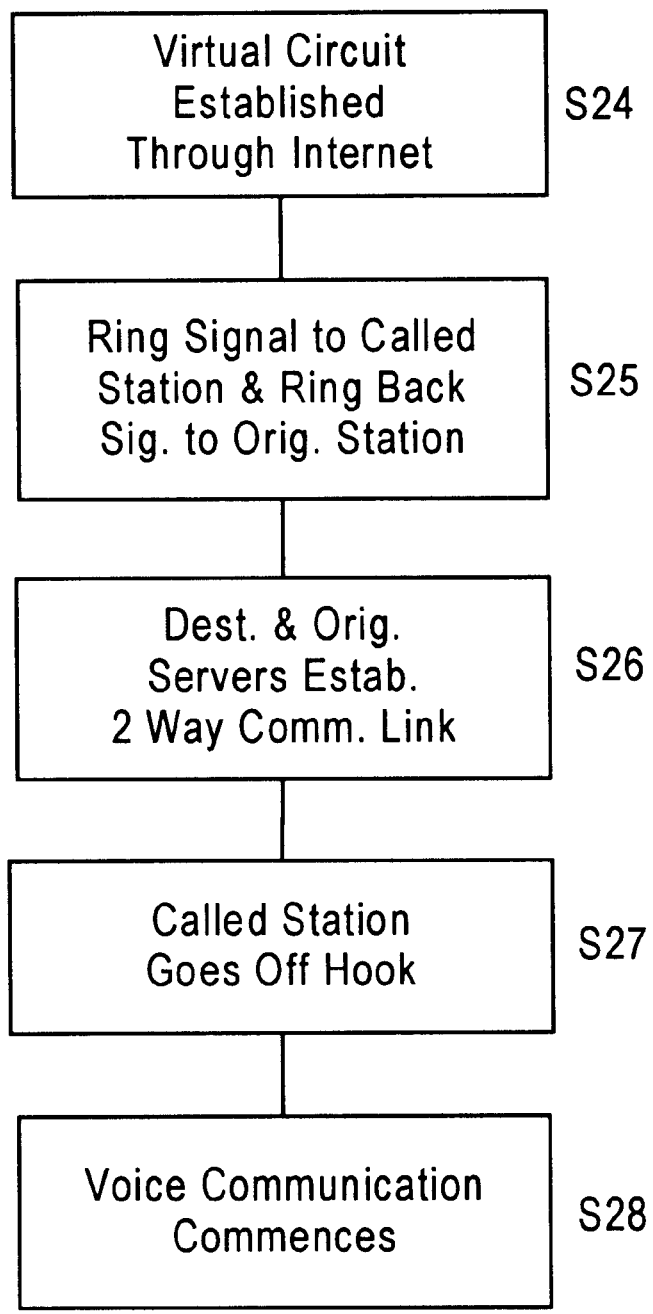

Referring to FIG. 17C, an Internet virtual connection is then established between the calling and called stations at step S24. The receiving or destination central office 606 provides a ringing signal to the called station Z and the originating central office 600 sends ringback tone back through the local loop to the calling station X in step S25. At the same time, the server 602 and the server 608 establish a two-way communication link on the predetermined virtual path at the prescribed service level in step S26. Specifically, the initial packets transmitted by each server will have identification information for the destination switches. Alternately, each server may use the reserved voice path connections for transmitting voice data packets. When the called station Z goes off-hook in step S27 and the Internet virtual connection is completed, the conversation via the Internet can commence in step S28. The billing may be implemented in the switch journal of the originating CO 600. As previously explained, the OSS first stores the information about call directory and automatic dialing or call completion. This is then transferred via the servers 602 and 612 to the switch 600. From this point billing may occur in the conventional manner.

While the preferred mode of call completion is accomplished under the control of the originating server 602 and switching system or CO 600 as has been described above, the invention also provides call completion under the control of the OSS. Pursuant to this mode the OSS responds to the caller acceptance by initiating a call through the Internet direct from the OSS server 612 to the destination server 608. Such a link is established using the same procedures as previously described in linking servers 602 and 605. The billing information is retained in storage in the OSS. During the time that the OSS is establishing this virtual connection, it retains the virtual connection between server 612 and the originating server 602.

When the virtual link to server 608 is established and the called party is on the line at station Z, the server 612 bridges the two calls or virtual circuits. Thus the virtual circuit between the originating server 602 and the OSS server 612 is bridged to the virtual circuit between the OSS server 612 and the destination server 608 in the OSS server 612. The OSS server is then aware when the virtual circuit is discontinued by either station going on-hook and notes the termination time of the call. Since the server 612 originated the call by bridging the two circuits it is also aware of the commencement time for the call. With this information and information as to the service provided by the OSS, the OSS can attend to appropriate billing. Alternatively, the OSS may engage in the signaling necessary to send this information to the server 602 and CO 600 whereby billing may be implemented from this point.

Figure 18:
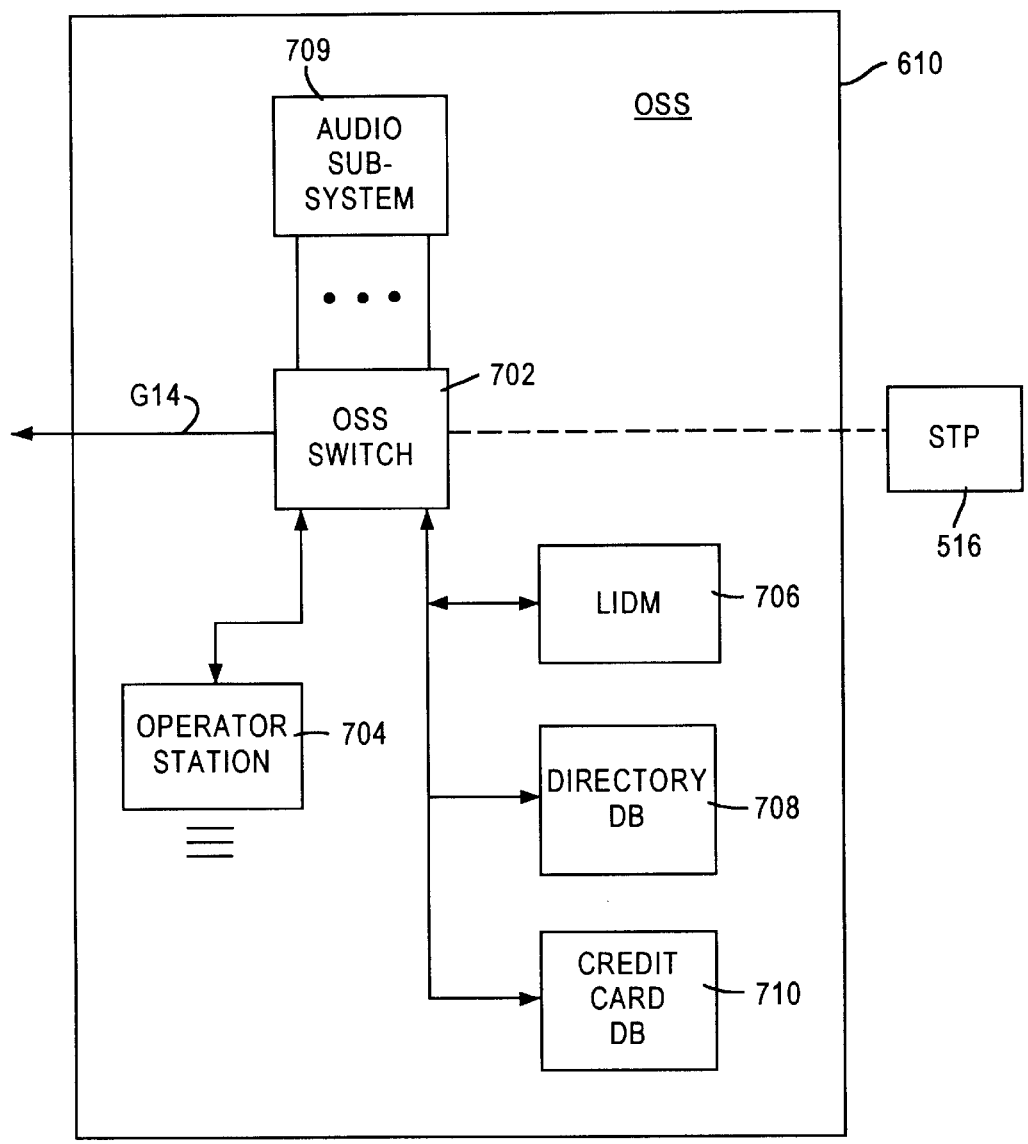
FIG. 18 shows a modified OSS which may be utilized in the Internet telephone system shown in FIG. 15 to implement special calling services with the aid of the operator stations shown in FIG. 15.

While the embodiment of the invention illustrated in FIGS. 15 and 16 included an OSS providing directory assistance there are a variety of telephone calls other than directory assistance that require the assistance of a human operator for completion. Among these are certain charge card calls, collect calls, and calls that are to be billed to a third party. FIG. 18 illustrates an OSS which may be utilized in the Internet telephone system shown in FIG. 15 to implement such special calling services with the aid of the operator stations shown in FIG. 16. The OSS shown in FIG. 18 is similar to the OSS shown in FIG. 15 with the addition of a credit card data base 710. Like reference numerals are used in FIGS. 15 and 18 to indicate like elements. The operation of this embodiment of the invention is now described in the handling of a credit or charge card call.

Credit Card Calls

Figure 19A:
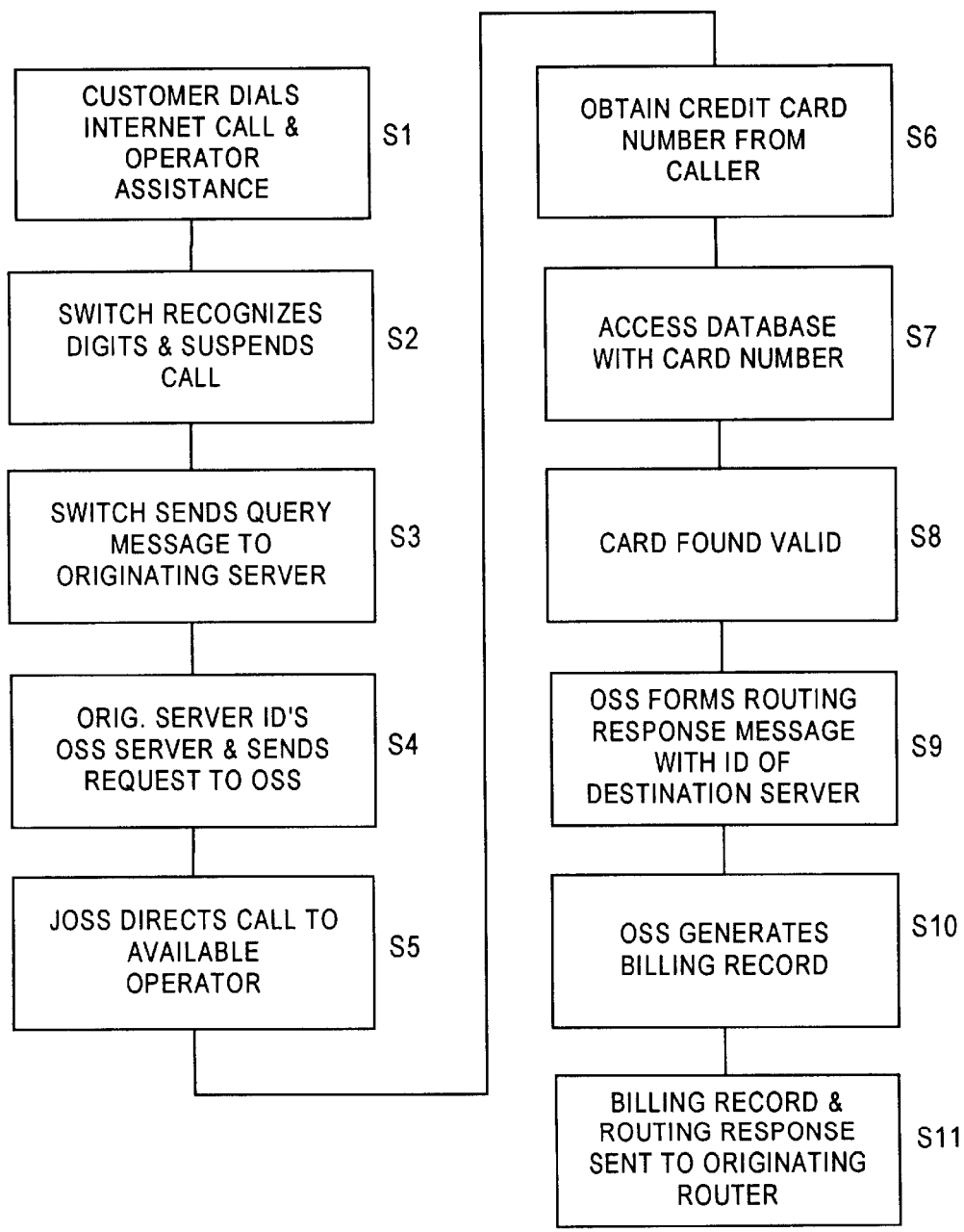
FIGS. 19A and 19B are flow diagrams illustrating one mode of operation of the system utilizing the OSS of FIG. 18 in the network shown in FIG. 15.
Figure 19B:
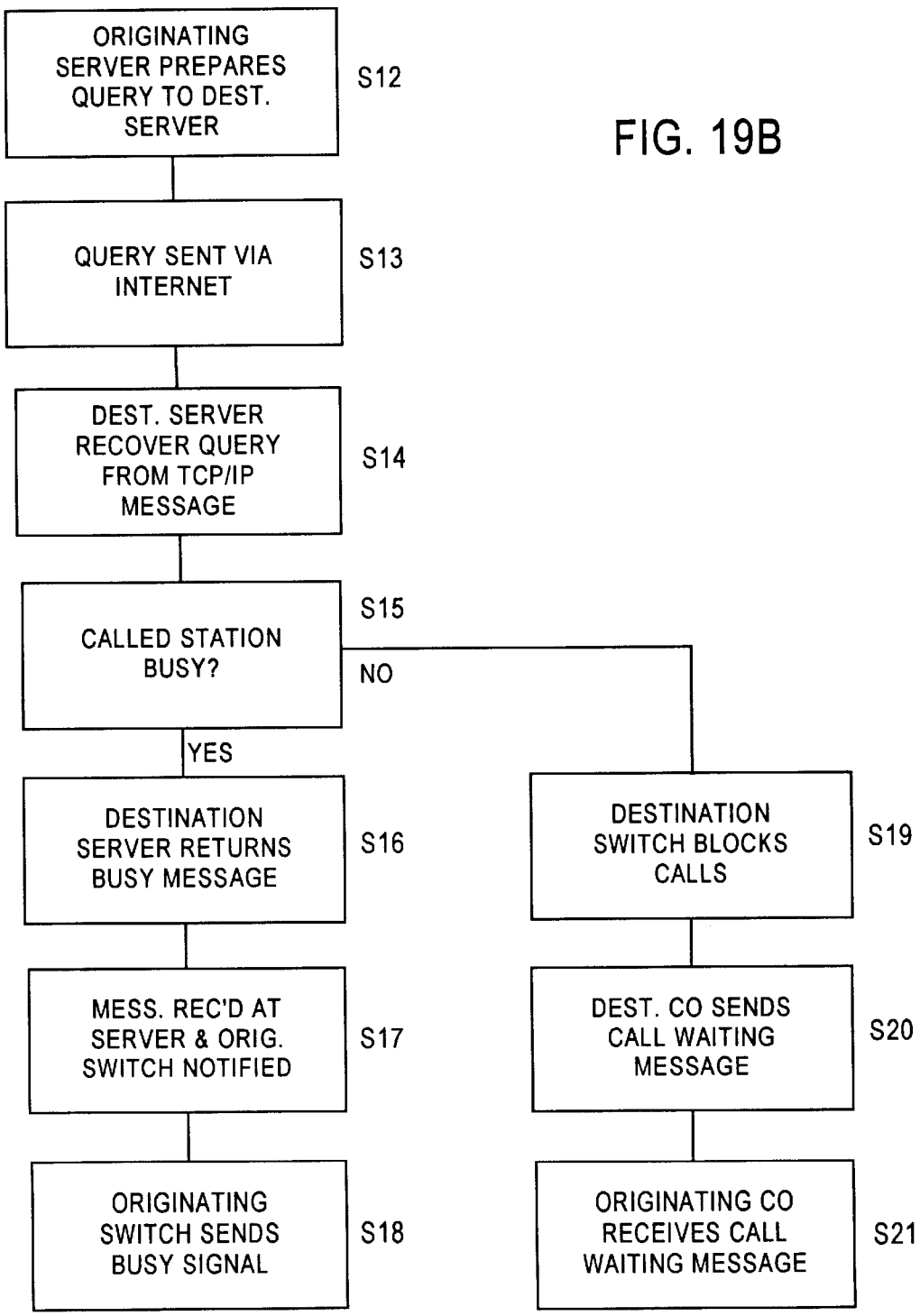

Referring to the flow diagram shown in FIGS. 19A and 19B, a caller at station X, assumed to be in Alexandria, Virginia, seeks to make an Internet call to a station in San Jose, California (assumed to be station Z), using a charge or credit card. The caller dials *82 followed by O+NPA+the called station's directory number (where NPA is the area code). This is shown at Si in FIG. 19A. As previously described, the prefix *82 has been established by the Telco offering the Internet service as a designated prefix with which the public may initiate an Internet telephone call. Thecentraloffice switching system 600 responds to the off-hook and receives the dialed digits from the calling station in step S2. The central office switching system analyzes the received digits and determines from the prefix *82 that the call is an Internet call. Responsive to its programming it knows that the call must be completed through a remote central office and that further processing is necessary. Also responsive to its programming it knows that the call is an operator assistance call.

In response to the PIC, the originating central office 600 suspends the call and sends a CCIS query message to the Internet server 602 via the signaling channel 603. This is shown in step S3. In response to the query message, the originating Internet server 602 identifies the Internet telephony server which services the OSS 610 and provides its IP address. This is accomplished in step S4 by sending a directory assistance routing request, including the number of the calling party X and the directory number of the called party. This request is sent to the OSS 610 through the Internet via originating server 602 and the OSS Internet server 612 as shown by the broken line through the Internet 604. At step S5 the OSS switch 602 switches the call to an idle directory assistance operator position terminal 602. The operator services switch 702 permits the operator station 704 to access data from the database 706, which provides current data relating to particular customer telephone lines, and to access data from the credit card database 710, which contains data relating to the validity status of charge or credit cards that may be used for billing calls.

The operator thereupon handles the call using current voice conversation methods, i.e., to obtain information to permit validating a particular credit card whose number has been obtained from the calling party (step S6). In accomplishing this the operator accesses the OSS credit card validation database 710 at step S7. If the charge card number is unacceptable and the call is therefore to be denied, the caller is advised accordingly via the voice path established through the Internet between the operator station and the calling station. Depending on the service, the caller may be given an opportunity to re-enter a card number or to make the call under another billing alternative.

While the card validation procedure which has been described refers to accessing the validation database 710, it will be understood that the actual database may comprise a centralized database system which is distributed. The first large scale system adopted for validating credit card calls utilized a nationwide collection of databases containing the required validation information. To participate, a given telephone company placed its validation data in one of such databases, so that it was available to all telephone companies through which a call may have been initiated. Such a credit card database system or a modification thereof may be used according to the present invention. Such a system is described, by way of example, in Olsen et al. U.S. Pat. No. 5,008,929, issued Apr. 16, 1991, entitled Billing System for Telephone Signaling Network. It will be understood by those skilled in the art that such databases may be arranged hierarchically so that a database search proceeds from one to the other in the manner of domain name databases. The connections between databases and between the OSS and the databases is made within the OSS in the case of its collocated local database. However such connections are preferably made through the Internet for further connections, such as connection to a centralized database or connection to the elements of a distributed database.

If the card number is valid, then, in one manner of operation according to the invention, the call is dialed back out from the OSS operator station 704 to the called station Z. With that call established from the OSS to the called telephone station Z, the end-to-end call path from calling station X to called station Z can be established by bridging the OSS ends of the call legs together in the OSS switch 702. This bridging methodology is indicated by the broken line paths through the Internet from the called station Z to the OSS, and from the OSS to the calling station X. Alternatively, however, in a preferred form of the invention, once the credit card number is determined within the OSS system to represent a valid account to which the call can be billed, and after the call is in that sense found to be acceptable (step S8), rather than completing the call from the OSS to the called station as described above, a signaling message is sent to the calling server 602 and switching system CO 600. By that message the calling server and originating switching system are advised that the call is approved for completion.

In the signaling message the OSS formulates a routing response for the originating server 602. The routing response includes the directory number of station Z and the identity (e.g., IP address) of the server 608 serving the called station Z. This is shown at S9. The response also includes information as to any predetermined virtual path between the two servers, and the minimum guaranteed service level (or default level) for the calling station X. At S10 the OSS switch generates a billing record for the operator assistance and includes this information with the routing data for storage and usage by the originating server 602. The routing message and billing information are sent to the originating server 602 at step Sli. When the response message is received by the originating server that server attempts to set up the Internet call as illustrated in the flow chart 19B.

Referring to that figure, the server 602 prepares a signaling message in the form of a call set up query. The query message is packetized in TCP/IP packets having the IP address of the destination server 608 as the destination address. This is shown at step S12. The signaling packets are received via the virtual path indicated by the broken line to the destination server 608 in step S13. This message includes a session ID, the called number, the calling number, and the requested data transmission rate having a minimum data rate corresponding to the prescribed service level. The destination server recovers the query message from the payload of the TCP/IP packets in step S14. In step S15 the destination server determines via CCIS to the SSP switch 606 whether or not the called station Z is busy.

If the called station Z is busy, the receiving central office 606 so informs the destination server 608 via the signaling network 605. In step S16 the server 606 returns a busy message to the originating server 602 using signaling packets in TCP/IP protocol. The originating server 602 recovers the busy message from the received data packets via the Internet, and informs the originating central office 600 of the busy condition via the signaling network 603 at step S17. The originating central office provides a busy signal to the calling station at step S18.

If the called station is not busy, the receiving central office 606 busies out the called station line 609 by blocking all calls at step S19. The receiving or destination central office 606 then informs the originating central office 600 via the Internet and servers 608 and 602, that the called line is available and waiting. This occurs at step S20. Specifically, at step S20, the server 608 sends a data packet including the session identifier and the available condition of the called party Z to the server 602 via the Internet. The server 602 recovers the signaling information including the session ID and available condition from the data packet transmitted by the server 608, and responds in step S21 to the query from the originating central office 602.

From this point the call is completed in the same manner as described in relation to FIG. 17C. Referring to FIG. 17C, an Internet virtual connection is then established between the calling and called stations at step S24. The receiving or destination central office 606 provides a ringing signal to the called station Z and the originating central office 600 sends ringback tone back through the local loop to the calling station X in step S25. At the same time, the server 602 and the server 608 establish a two-way communication link on the predetermined virtual path at the prescribed service level in step S26. The initial packets transmitted by each server will have identification information for the destination switches. Alternately, each server may use the reserved voice path connections for transmitting voice data packets. When the called station Z goes offhook in step S27 and the Internet virtual connection is completed, the conversation via the Internet can commence in step S28. The billing may be implemented in the switch journal of the originating CO 600.

Collect Calls

Figure 20:
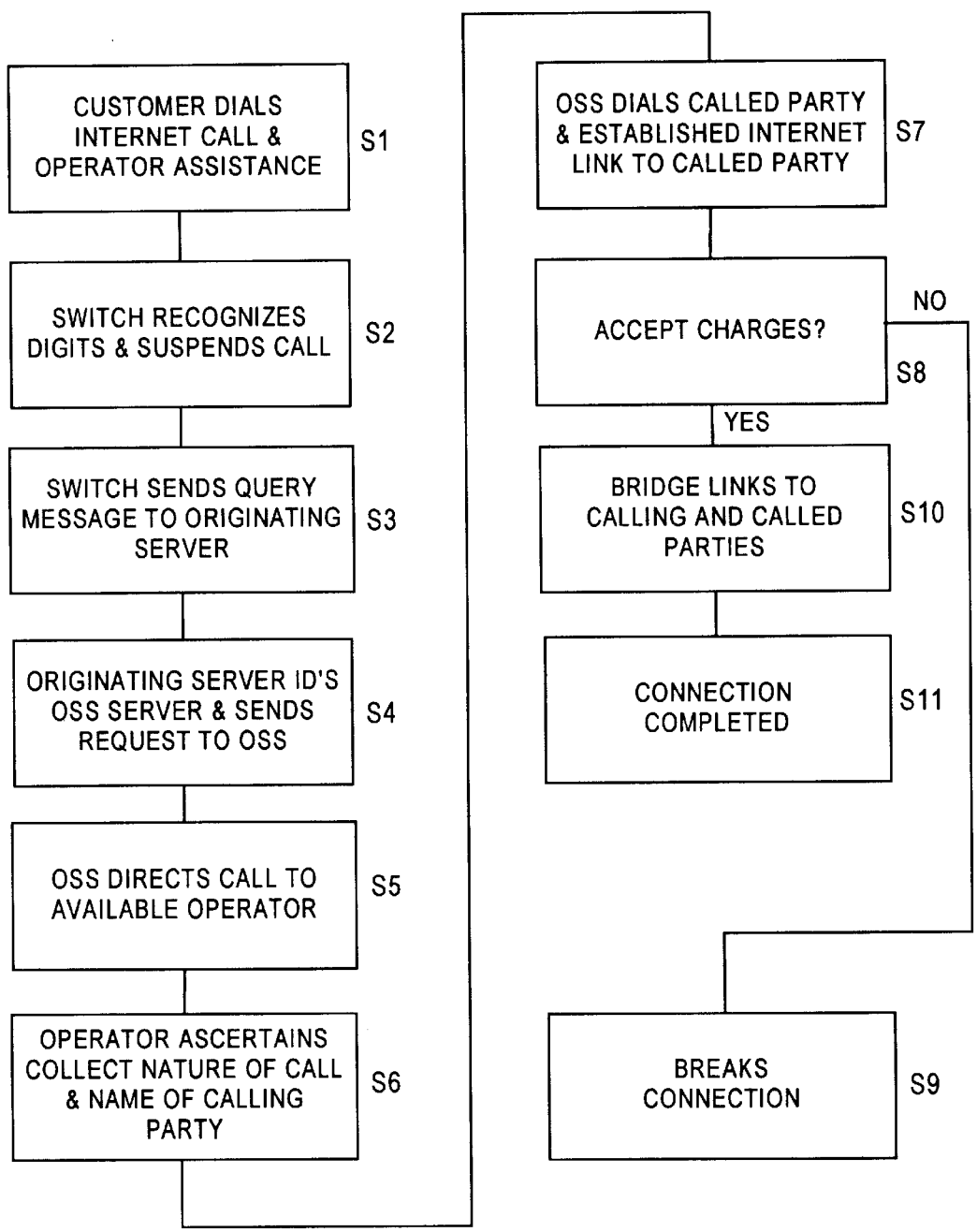
FIG. 20 is a flow diagram illustrating one mode of operation of the system utilizing the OSS of FIG. 18 in the network shown in FIG. 15 to provide collect call service.

Referring to the flow diagram shown in FIG. 20, a caller at station X, again assumed to be in Alexandria, Va., seeks to make an Internet call to a station in San Jose, Calif. (assumed to be station z), and to make that call a collect call. The caller dials *82 followed by O+NPA+the called station's directory number. This is shown at S1 in FIG. 20. The central office switching system 500 responds to the off-hook and receives the dialed digits from the calling station. The switching system analyzes the received digits and determines from the prefix *82 that the call is an Internet call. Responsive to its programming it knows that the call must be completed through a remote central office and that further processing is necessary. Also responsive to its programming it knows that the call is an operator assistance call. In response to the PIC, the originating central office 500 suspends the call at step S2. At step S3 the CO 500 sends a CCIS query message to the Internet server 502 via the signaling channel 503. In response to the query message, the originating Internet server 502 identifies the Internet telephony server which services the OSS 510 and sends an operator assistance request, including the number of the calling party X and the directory number of the called party. This request is sent to the OSS 510 through the Internet via originating server 502 and the OSS Internet server 512, as shown by the broken line through the Internet 512. At step S5 the OSS switch 602 switches the call to an idle directory assistance operator position terminal 604. The operator thereupon handles the call using current voice conversation methods, i.e., to obtain information to permit the operator to ascertain the nature of the call and, upon learning that it is a collect call, whether the called party will accept charges for the call.

The operator at position 604 queries the calling party as to the nature of the call. On learning that it is a collect call the operator queries the caller as to the name to be used to identify the party requesting the collect call. This is shown at step S6. At step S7 the requested call is dialed out from the operator station 704 to the called station Z and a voice link established through the Internet as shown by the broken line. At step S8 the operator queries the called party at station Z as to whether or not the called party will accept charges for a call from the party whose name the operator just ascertained. If the response is negative the operator so informs the calling party and breaks both connections. This is shown at step S9. If the response is affirmative, the call legs to the called station Z and to the calling station X are bridged together in the OSS switch 702 thereby completing the requested connection. This is shown at step S10. The billing information is compiled in the OSS.

Third Party Charge

Figure 21:
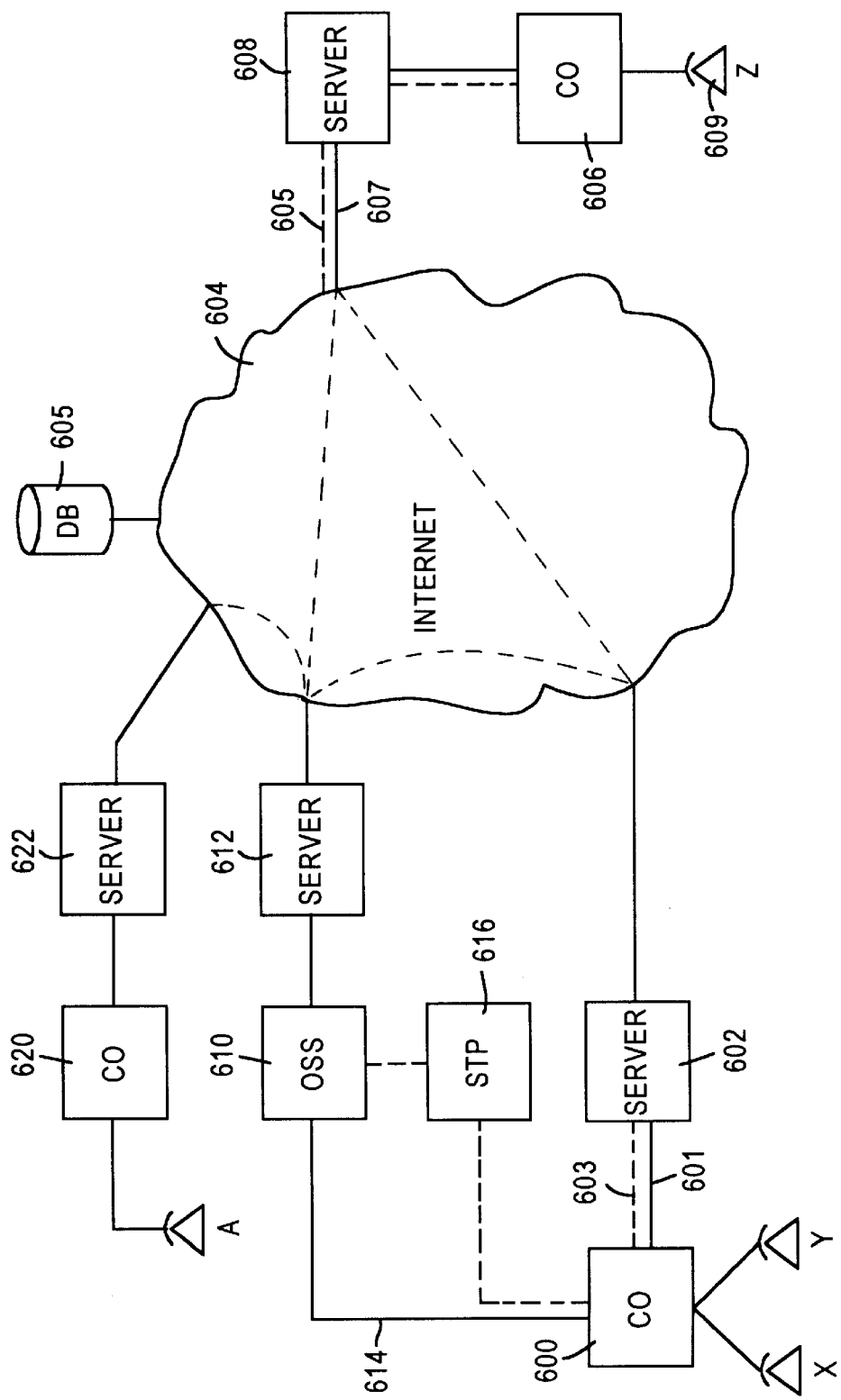
FIG. 21 shows a network architecture similar to that in FIG. 15 but with certain additions to illustrate the handling of third party charge calls according to one embodiment of the invention.

FIG. 21 shows a network architecture similar to that in FIG. 15 but with the addition of an added telephone station A, end office CO 620, and Internet server or router 622.

Figure 22:
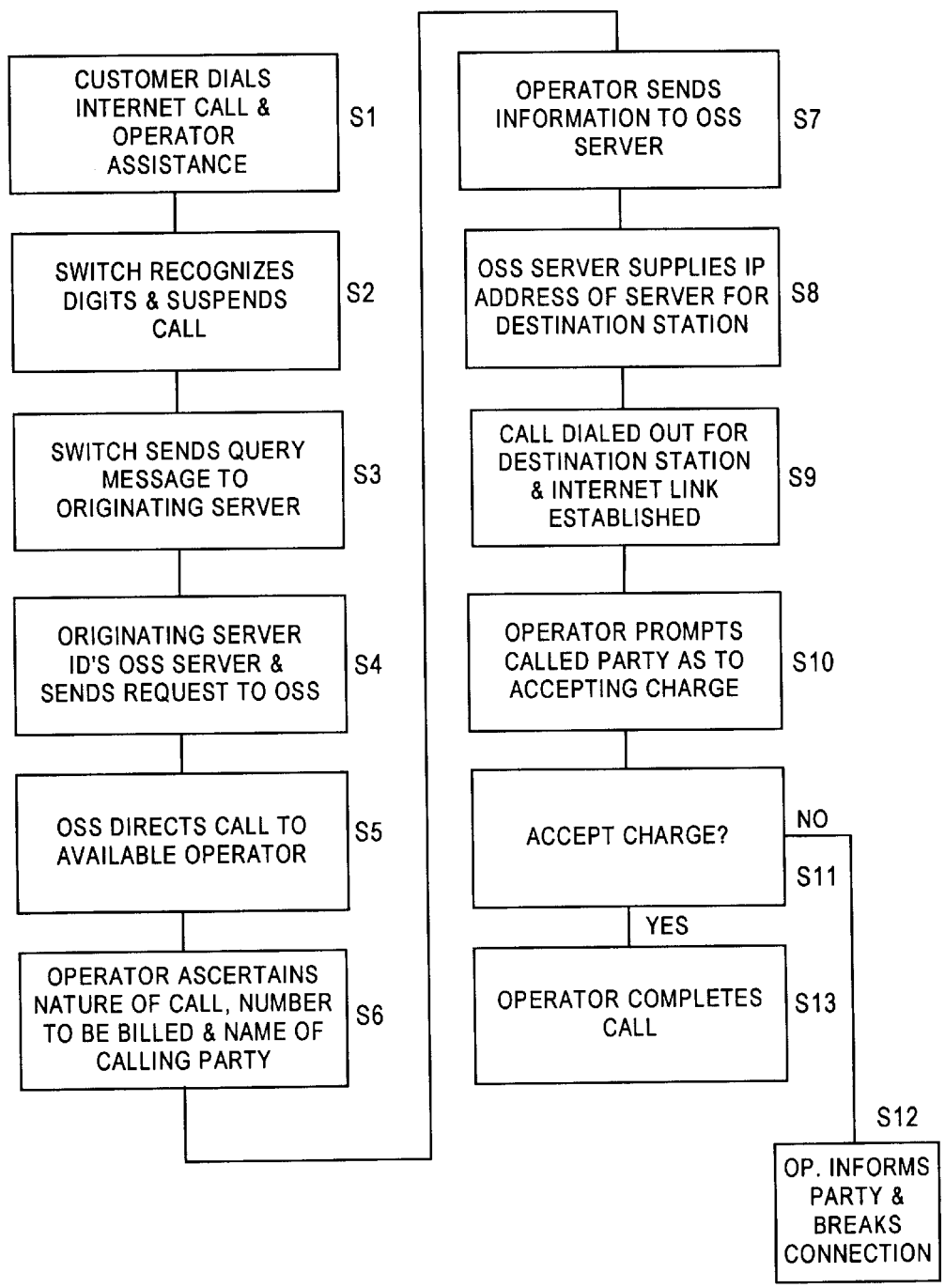
FIG. 22 is a flow diagram illustrating one mode of operation of the network shown in FIG. 21 to provide handling of third party charge calls according to one embodiment of the invention.

Referring to the simplified flow diagram shown in FIG. 22, a caller at station X seeks to make an Internet call to station Z, and to charge that call to a third party, namely the party associated with station A. The caller dials *82 followed by O+NPA+the called station's directory number. This is shown at step S10 in FIG. 22. The central office switching system 500 responds to the off-hook and receives the dialed digits from the calling station in step S2. The central office switching system analyzes the received digits and determines from the prefix *82 that the call is an Internet call. Responsive to its programming it knows that the call must be completed through a remote central office and that further processing is necessary. Also responsive to its programming it knows that the call is an operator assistance call. In response to the PIC the originating central office 500 suspends the call at step S2. At step S3 the CO 500 sends a CCIS query message to the Internet server 502 via the signaling channel 503. In response to the query message, the originating Internet server 502 identifies the Internet telephony server which services the OSS 510 and sends an operator assistance request, including the number of the calling party X and the directory number of the called party. This request is sent to the OSS 510 through the Internet via originating server 502 and the OSS Internet server 512 as shown by the broken line through the Internet 512. At step S5 the OSS switch 602 switches the call to an idle directory assistance operator position terminal 604. The operator thereupon handles the call using current voice conversation methods, i.e., to obtain information to ascertain the nature of the call and, upon learning that it is a third party charge call, to permit the operator to establish a link to the third party and ascertain whether that party will accept charges for the call.

At step S6 the operator at position 604 queries the calling party as to the nature of the call, the directory number to which the charge is to be billed, and the name to be used to identify the party requesting the third party billing. This is shown at step S6. At step S7 the operator sends the information thus obtained to the OSS server 612. The OSS server supplies the IP address of the server for the CO serving the third party station A. This is shown at step S8. At step S9 a call for station A is dialed out by the OSS 610 and an Internet link is established to station A. This is shown by the broken line from server 612 to server 622 in FIG. 21. Via this link the OSS operator prompts the party at station A as to the request for third party billing as shown at step S10. At step S11 an affirmative or negative response is obtained from the party at station A. If the response is negative the operator informs the caller at X via the Internet link and discontinues both links to stations A and X. This is indicated at step S12. If the response from the party at station A is affirmative, the operator completes the call to station Z in the manner described with relation to FIGS. 19A and 19B. This is indicated in FIG. 22 at step S13.

Automated Operator Assistance

While the foregoing embodiments of the invention have been described in the environment of human operator assistance, it is also a feature of the invention that the operator assistance may be provided in an automated fashion while retaining the advantages of the hybrid wired telephone network/Internet system which are herein described. Although human operators are still rather extensively used to provide the services that special service calls require, fully automated operator services, operable without human intervention, are now also widely used, and it is common in many contexts to simply speak of "operator services" without regard for whether the services are automated or not. An automated version of the invention is now described using a modified OSS which includes a Traffic Service Position System (TSPS) having a Special Service Announcement System (SSAS). Such a TSPS is comprehensively described in R. J. Jaeger, Jr. et al. U.S. Pat. No. 3,484,560, issued Dec. 16, 1966, and also in the December, 1970 issue of the Bell System Technical Journal. The SSAS is described in Comella et al. U.S. Pat. No. 4,054,756, issued Oct. 18, 1977, entitled Method and Apparatus for Automating Special Service Call Handling.

Figure 23:
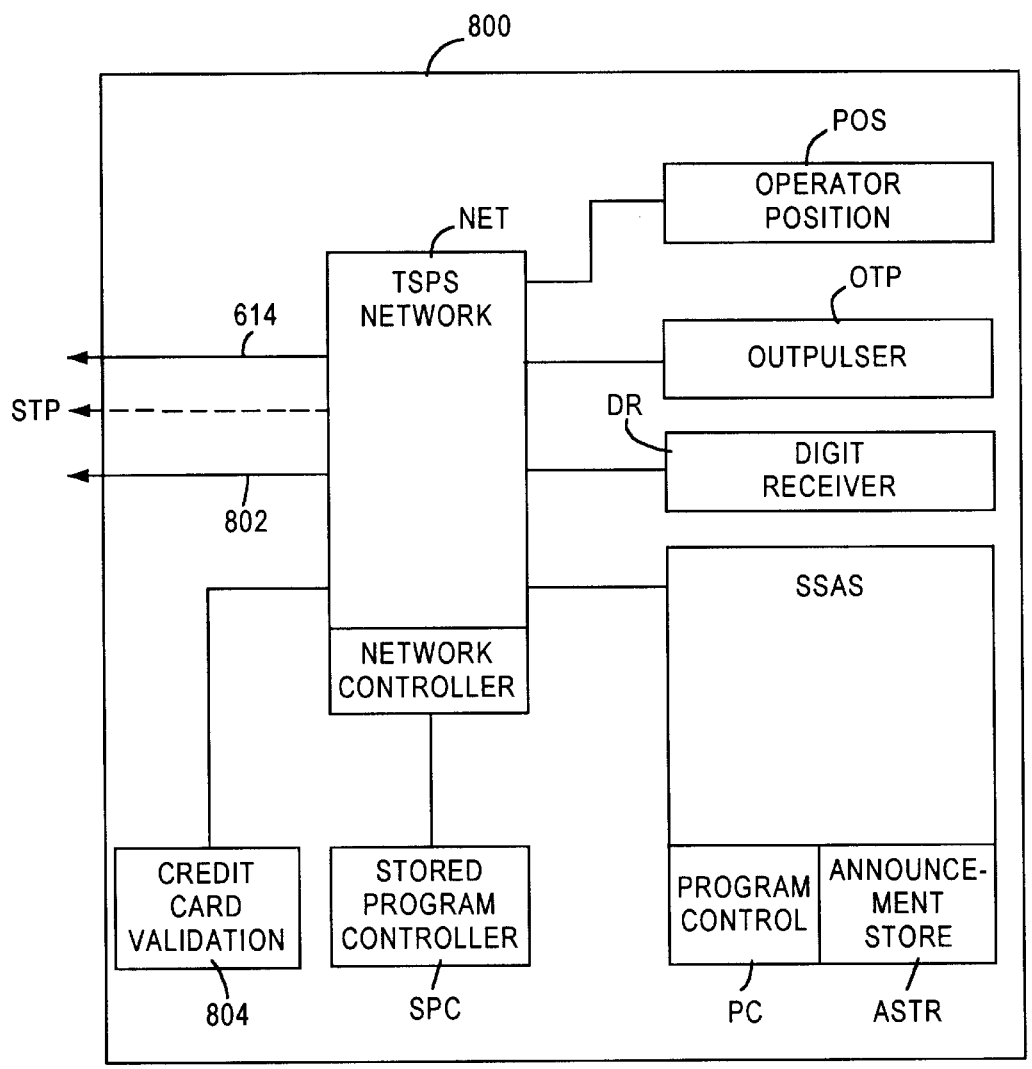
FIG. 23 provides a diagrammatic illustration of a modified form of OSS which is suitable for use in the system of FIG. 21 to provide automated handling of special service calls according to one embodiment of the invention.

Referring to FIG. 23 there is shown a diagrammatic illustration of the modified form of OSS 800 which is suitable for use in the system of FIG. 21 to provide automated handling of special service calls according to one embodiment of the invention. The OSS 800 includes a TSPS network NET which is connected to the CO 600 via trunk 614. The trunk 614 may be a Feature Group D trunk providing signaling and/or the TSPS may be connected to the STP 616. The TSPS is also connected to the OSS server 612 by line or trunk 802. The TSPS network controller NTC is connected to and controlled by the stored program controller SPC. A series of operator positions POS are connected to the TSPS along with a digit outpulser OTP and a digit receiver DR. The credit card database is shown at 804. As previously described, this database may be collocated with the OSS but is preferably distributed. The special service announcement system is shown at SSAS. The SSAS includes an announcement store ASTR and a programmable controller PC, which is connected to the SPC. In operation the SPC commands the programmable controller PC to provide a tone or announcement requesting a caller who is connected to the TSPS to identify the type of service desired. An example of what might be stated in the instruction is as follows: "Please indicate the type of call you are instituting by depressing the appropriate two dialing keys:

11 for collect
12 for charge to third number
13 for credit card

The digit receiver stores the dialed digits. A generic approach is utilized in the OSS to service each of these call types. While the call types are herein described in terms of identification by digits, or DTMF tones, the invention comprehends the use of known voice recognition techniques to permit the nature of the call to be determined via voice responses and voice recognition.

In the case of handling each of the three above listed type calls, namely, collect, charge to third number, and credit card, the OSS becomes involved in the call handling procedure following the performance of steps S1–S4, previously described in connection with FIG. 19A.

Collect Call

If the "11" digits from the calling customer station are received to indicate a collect call, the programmable controller PC accesses the store ASTR to retrieve an appropriate announcement (in the form of digital data words indicating delta modulated audio speech). This particular announcement may be, for example, "At the tone, please state your name, . . . (tone)." This digital announcement in decoded or translated analog voice form is delivered to the caller. Upon hearing the tone, the caller would then state his or her name. The received name is then recorded and stored in digital form in the announcement store ASTR. The SPC then controls the outpulser to outpulse or autodial the called number which was previously received and stored. When the OSS receives the signal that the called station has gone off-hook, answer supervision is returned to the TSPS in the normal manner. A synthesized announcement is then supplied to the called station. This announcement may indicate "This is a collect call from - - - ." The previously recorded name information from the calling station is inserted after the word "from" in this announcement. This called station announcement may further indicate "If you accept this call, please depress buttons 97, and if you will not accept this call depress buttons 66." The responsive signals resulting from the dual tone signals from the called station are received by the digit receiver. If the signal 97 is received, controller PC so informs the SPC. The SPC then completes the call in the manner discussed in relation to steps S9 and S10 in FIG. 20. If the called party responded with a "no" (66) or did not respond with either a yes or no (97 or 66) within an appropriate time interval such as five seconds, the connection to the called station would be dropped and an appropriate announcement conveyed to the calling station, indicating that the charges were not accepted at the called station. The call also would be terminated for the calling subscriber.

Charge to Third Party Call

A charge-to-third-party call is handled in almost the same manner as a collect call except, initially, an inquiry connection is established to the third party. During the initial contact with the calling party, the party is requested "At the tone, please dial the area code and number to which you wish to charge this call . . . (tone)." These dialed digits are received by the digit receiver and stored for later use. An "inquiry" connection is then established to the third party station in the same manner as previously described to contact the called party station with a collect call. During the dialing of the third party an announcement is delivered to the calling party requesting "At the tone, please state your name . . . (tone)." This name is recorded and stored in memory ASTR in the same manner as previously described for collect calls.

When answer supervision is returned via the inquiry connection from the third party station, an announcement is sent to the third party indicating "(name of calling party) wishes to charge a call to XXX-XXX-XXXX (called number) to this number. If you accept the charges, dial 97; if you will not accept the charges, dial 66." If the third party accepts the charges by dialing 97, the inquiry connection from the TSPS to the third party station is knocked down. A connection is then established between the calling and indicated desired called station in the manner described in steps S12–S21 in relation to FIG. 19B. If in the previous example, the third party did not accept the charges and so indicated by dialing 66 (or hanging up), then an announcement is conveyed to the calling station indicating that "your call was not accepted."

Credit Card Call

If the "13" digits from the calling customer station are received to indicate a credit card call, the programmable controller PC accesses the store ASTR to retrieve an appropriate announcement. This may be, for example, "At the tone, please state your card number, . . . (tone)." This digital announcement in translated analog voice format is delivered to the caller. Upon hearing the tone, the caller would then state the credit card number. The received number is then recorded and stored in digital form in the announcement store ASTR. The SPC then controls the NTC to cause a search of the credit card validation database in the manner previously described. The process then continues in the manner described in connection with steps S7–S21 in FIGS. 19A and 19B.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of establishing an interactive voice telephone call between a first public switched telephone network (PSTN) subscriber station and a second PSTN subscriber station remote therefrom through a communication link that includes a data packet internetwork of the Internet, comprising the steps of:

in response to a predetermined sequence of signals input upon off-hook by said first subscriber station, linking the subscriber station to a services system position through the Internet;

issuing a request for information by said services system position through the Internet link to the first subscriber station;

in response to receipt at said services system position of the requested information from the first subscriber station through the Internet, accessing an information source to obtain information therefrom;

comparing the accessed information with the received information to determine whether there is a match;

in response to a match determined in the comparing step, completing the call between the first subscriber station and the second subscriber station through the Internet, wherein said information source comprises said second station.

2. A method of establishing an interactive voice telephone call between a first public switched telephone network (PSTN) subscriber station and a second PSTN subscriber station remote therefrom through a communication link that includes a data packet internetwork of the Internet, comprising the steps of:

in response to a predetermined sequence of signals input upon off-hook by said first subscriber station, linking the subscriber station to a services system position through the Internet;

issuing a request for information by said services system position through the Internet link to the first subscriber station;

in response to receipt at said services system position of the requested information from the first subscriber station through the Internet, accessing an information source to obtain information therefrom;

comparing the accessed information with the received information to determine whether there is a match;

in response to a match determined in the comparing step, completing the call between the first subscriber station and the second subscriber station through the Internet, wherein the accessed information is transmitted as an analog voice signal.

3. A communications system comprising in combination:

a first public switched telephone network (PSTN) switching system connected to a first subscriber station, the first switching system being coupled to the Internet at a first interface;

a second PSTN switching system, remote from the first switching system, and connected to a second subscriber station, the second switching system being coupled to the Internet at a second interface;

a transaction device database; and a services system position coupled to the Internet at a third interface;

wherein said first PSTN switching, system is responsive to a predetermined sequence of signals input by said first subscriber station upon an initiated off-hook telephone call to said second subscriber station, to link the first subscriber station through the Internet to said services system position for receipt of information, said services system position is responsive to said completion of said link to access information from said transaction device database for comparison with the received information and, in response to a match of the accessed information with the received information, to complete the call through the Internet between the first subscriber station and the second subscriber station, identified by the first subscriber station, wherein the received information is obtained from said second subscriber station.

4. A system as recited in claim 3, wherein the received information is obtained from said second subscriber station via the Internet.

5. A communications system comprising in combination:

a first public switched telephone network (PSTN) switching system connected to a first subscriber station, the first switching system being coupled to the Internet at a first interface;

a second PSTN switching system, remote from the first switching system, and connected to a second subscriber station, the second switching system being coupled to the Internet at a second interface;

a transaction device database; and a services system position coupled to the Internet at a third interface;

wherein said first PSTN switching system is responsive to a predetermined sequence of signals input by said first subscriber station upon an initiated off-hook telephone call to said second subscriber station, to link the first subscriber station through the Internet to said services system position for receipt of information, said services system position is responsive to said completion of said link to access information from said transaction device database for comparison with the received information and, in response to a match of the accessed information with the received information, to complete the call through the Internet between the first subscriber station and the second subscriber station, identified by the first subscriber station, wherein the received information is obtained from a third subscriber station via the Internet.

6. A communications system comprising in combination:

a first public switched telephone network (PSTN) switching system connected to a first subscriber station, the first switching system beinq coupled to the Internet at a first interface;

a second PSTN switching system, remote from the first switching system and connected to a second subscriber station, the second switching svstem being coupled to the Internet at a second interface;

a transaction device database; and a services system position coupled to the Internet at a third interface;

wherein said first PSTN switching system is responsive to a predetermined sequence of signals input by said first subscriber station upon an initiated off-hook telephone call to said second subscriber station, to link the first subscriber station through the Internet to said services system position for receipt of information, said services system position is responsive to said completion of said link to access information from said transaction device database for comparison with the received information and, in response to a match of the accessed information with the received information, to complete the call through the Internet between the first subscriber station and the second subscriber station, identified by the first subscriber station, wherein said services system position includes a stored program controller, an announcement system and a traffic service position system (TSPS).

7. A method of establishing an interactive voice telephone call between a first public switched telephone network (PSTN) subscriber station and a second PSTN subscriber station remote therefrom through a communication link that includes a data packet internetwork of the Internet, comprising the steps of:

in response to a predetermined sequence of signals input upon off-hook by said first subscriber station, linking the subscriber station to a services system position through the Internet;

issuing a request for information by said services system position through the Internet link to the first subscriber station;

in response to receipt at said services system position of the requested information from the first subscriber station through the Internet, accessing an information source to obtain information therefrom;

comparing the accessed information with the received information to determine whether there is a match;

in response to a match determined in the comparing step, completing the call between the first subscriber station and the second subscriber station through the Internet.

8. A method as recited in claim 7, wherein said linking step comprises transmitting a message signal from the PSTN of the first subscriber station to a server coupled to the Internet.

9. A method as recited in claim 8, wherein said message signal is formulated in a telephone signaling protocol and said linking step further comprises transforming said message to an Internet transport protocol for transmission through the Internet.

10. A method as recited in claim 7, wherein said issuing step comprises:

transporting the request as a digital packet signal through the Internet to the PSTN of the first subscriber station; and delivering the request as an analog voice signal to the first subscriber station.

11. A method as recited in claim 10, wherein the requested information is received by the services system position is steps comprising:

obtaining the information from the first subscriber as an analog signal; and transporting the information through the Internet as data packet signal.

12. A method as recited in claim 7, wherein said information source comprises a database.

13. A method as recited in claim 7, wherein said information source comprises a third station.

14. A method as recited in claim 7, wherein the Internet link is connected to said first PSTN via a first interface and connected to said second PSTN via a second interface, and wherein signals traversing said communication link are formatted in telephone signaling protocol in PSTN link portions and formatted in Internet data packet protocol in Internet link portions.

15. A method as recited in claim 14, wherein said Internet data packet protocol is Transmission Control Protocol/ Internet Protocol (TCP/IP) and said telephone signaling protocol is a common channel interoffice signaling (CCIS) protocol.

16. A communications system comprising in combination:

a first public switched telephone network (PSTN) switching system connected to a first subscriber station, the first switching system being coupled to the Internet at a first interface;

a second PSTN switching system, remote from the first switching system, and connected to a second subscriber station, the second switching system being coupled to the Internet at a second interface;

a transaction device database; and a services system position coupled to the Internet at a third interface;

wherein said first PSTN switching system is responsive to a predetermined sequence of signals input by said first subscriber station upon an initiated off-hook telephone call to said second subscriber station, to link the first subscriber station through the Internet to said services system position for receipt of information from said first subscriber station, said services system position is responsive to said completion of said link to access information from said transaction device database for comparison with the received information, and responsive to a match of the accessed information with the received information to complete the call through the Internet between the first subscriber station and the second subscriber station, identified by the first subscriber station.

17. A communications system as recited in claim 16, wherein said first PSTN comprises a common channel interoffice signaling network connected to said first switching system for transporting a control signal to establish the link with the services system position.

18. A system as recited in claim 17, wherein the accessed information is obtained from said database via the Internet.

19. A system as recited in claim 17, wherein said services system position includes a switching system, a stored program controller, and an announcement system.

* * * * *